United States Patent
Lynch et al.

(10) Patent No.: US 10,099,140 B2
(45) Date of Patent: Oct. 16, 2018

(54) SYSTEM AND METHOD FOR GENERATING PERSONALIZED MESSAGING CAMPAIGNS FOR VIDEO GAME PLAYERS

(71) Applicant: ACTIVISION PUBLISHING, INC., Santa Monica, CA (US)

(72) Inventors: Eric James Lynch, Manhattan Beach, CA (US); Darryl Kanouse, Redondo Beach, CA (US)

(73) Assignee: ACTIVISION PUBLISHING, INC., Santa Monica, CA (US)

( * ) Notice: Subject to any disclaimer, the term of this patent is extended or adjusted under 35 U.S.C. 154(b) by 77 days.

(21) Appl. No.: 15/074,502

(22) Filed: Mar. 18, 2016

(65) Prior Publication Data

US 2017/0100676 A1  Apr. 13, 2017

Related U.S. Application Data

(60) Provisional application No. 62/238,938, filed on Oct. 8, 2015.

(51) Int. Cl.
*A63F 13/352* (2014.01)
*A63F 13/79* (2014.01)
*A63F 13/61* (2014.01)

(52) U.S. Cl.
CPC ............ *A63F 13/79* (2014.09); *A63F 13/352* (2014.09); *A63F 13/61* (2014.09)

(58) Field of Classification Search
CPC .... A63F 13/5375; A63F 13/533; A63F 13/79; A63F 13/352
See application file for complete search history.

(56) References Cited

U.S. PATENT DOCUMENTS 4,972,461 A  11/1990  Brown
5,031,089 A   7/1991  Liu
(Continued)

FOREIGN PATENT DOCUMENTS

AU        768367      3/2004
AU      2005215048   10/2011
(Continued)

OTHER PUBLICATIONS

Supplementary European Search from the European Patent Office for EP05723458.5, dated Jul. 19, 2010.
(Continued)

*Primary Examiner* — Jay Liddle
(74) *Attorney, Agent, or Firm* — Novel IP

(57) ABSTRACT

A system and method for generating personalized messaging campaigns for video game players is provided. A video game player's profile data and/or behavioral data may be used to create a customized messaging campaign for the player. The messaging campaign may comprise one or more messages, each selected from a variety of message types, that may be delivered to a game player through one or more channels, at predetermined time intervals. Examples of message types may include gameplay tips, techniques, strategy information, news, awards, milestones, promotions relating to microtransactions (e.g., offers, discounts, etc.), overviews of new products, features, etc., or other message types. Any number of predefined messages may exist (e.g., tens, hundreds, thousands, etc.) for each message type.

18 Claims, 17 Drawing Sheets

(56) References Cited

U.S. PATENT DOCUMENTS

| | | |
|---|---|---|
| 5,347,306 A | 9/1994 | Nitta |
| 5,442,569 A | 8/1995 | Osano |
| 5,493,692 A | 2/1996 | Theimer |
| 5,528,745 A | 6/1996 | King |
| 5,530,796 A | 6/1996 | Wang |
| 5,539,883 A | 7/1996 | Allon |
| 5,561,736 A | 10/1996 | Moore |
| 5,563,946 A | 10/1996 | Cooper |
| 5,627,978 A | 5/1997 | Altom |
| 5,630,129 A | 5/1997 | Wheat |
| 5,634,129 A | 5/1997 | Dickinson |
| 5,685,775 A | 11/1997 | Bakoglu |
| 5,706,507 A | 1/1998 | Schloss |
| 5,708,764 A | 1/1998 | Borrel |
| 5,736,985 A | 4/1998 | Lection |
| 5,736,990 A | 4/1998 | Barrus |
| 5,737,416 A | 4/1998 | Cooper |
| 5,745,678 A | 4/1998 | Herzberg |
| 5,762,552 A | 6/1998 | Vuong |
| 5,768,511 A | 6/1998 | Galvin |
| 5,774,668 A | 6/1998 | Choquier |
| 5,819,084 A | 10/1998 | Shapiro |
| 5,825,877 A | 10/1998 | Dan |
| 5,835,692 A | 11/1998 | Cragun |
| 5,860,137 A | 1/1999 | Raz |
| 5,861,883 A | 1/1999 | Cuomo |
| 5,878,233 A | 3/1999 | Schloss |
| 5,883,628 A | 3/1999 | Mullaly |
| 5,900,879 A | 5/1999 | Berry |
| 5,903,266 A | 5/1999 | Berstis |
| 5,903,271 A | 5/1999 | Bardon |
| 5,911,045 A | 6/1999 | Leyba |
| 5,920,325 A | 7/1999 | Morgan |
| 5,923,324 A | 7/1999 | Berry |
| 5,938,722 A | 8/1999 | Johnson |
| 5,960,173 A | 9/1999 | Tang |
| 5,969,724 A | 10/1999 | Berry |
| 5,977,979 A | 11/1999 | Clough |
| 5,990,888 A | 11/1999 | Blades |
| 6,008,848 A | 12/1999 | Tiwari |
| 6,009,455 A | 12/1999 | Doyle |
| 6,014,145 A | 1/2000 | Bardon |
| 6,021,268 A | 2/2000 | Johnson |
| 6,025,839 A | 2/2000 | Schell |
| 6,034,683 A | 3/2000 | Mansour |
| 6,049,819 A | 4/2000 | Buckle |
| 6,058,266 A | 5/2000 | Megiddo |
| 6,059,842 A | 5/2000 | Dumarot |
| 6,069,632 A | 5/2000 | Mullaly |
| 6,072,942 A | 6/2000 | Stockwell |
| 6,081,270 A | 6/2000 | Berry |
| 6,081,271 A | 6/2000 | Bardon |
| 6,088,727 A | 7/2000 | Hosokawa |
| 6,091,410 A | 7/2000 | Lection |
| 6,094,196 A | 7/2000 | Berry |
| 6,094,681 A | 7/2000 | Shaffer |
| 6,098,056 A | 8/2000 | Rusnak |
| 6,101,538 A | 8/2000 | Brown |
| 6,104,406 A | 8/2000 | Berry |
| 6,105,055 A | 8/2000 | Pizano |
| 6,111,581 A | 8/2000 | Berry |
| 6,122,663 A | 9/2000 | Lin |
| 6,134,588 A | 10/2000 | Guenthner |
| 6,141,699 A | 10/2000 | Luzzi |
| 6,144,381 A | 11/2000 | Lection |
| 6,147,977 A | 11/2000 | Thro |
| 6,148,328 A | 11/2000 | Cuomo |
| 6,179,713 B1 | 1/2001 | James |
| 6,185,614 B1 | 2/2001 | Cuomo |
| 6,201,881 B1 | 3/2001 | Masuda |
| 6,205,498 B1 | 3/2001 | Habusha |
| 6,212,548 B1 | 4/2001 | Desimone |
| 6,216,165 B1 | 4/2001 | Woltz |
| 6,222,551 B1 | 4/2001 | Schneider |
| 6,271,842 B1 | 8/2001 | Bardon |
| 6,271,843 B1 | 8/2001 | Lection |
| 6,282,547 B1 | 8/2001 | Hirsch |
| 6,308,208 B1 | 10/2001 | Jung |
| 6,311,206 B1 | 10/2001 | Malkin |
| 6,314,465 B1 | 11/2001 | Paul |
| 6,330,281 B1 | 12/2001 | Mann |
| 6,334,141 B1 | 12/2001 | Varma |
| 6,336,134 B1 | 1/2002 | Varma |
| 6,337,700 B1 | 1/2002 | Kinoe |
| 6,345,287 B1 | 2/2002 | Fong |
| 6,349,091 B1 | 2/2002 | Li |
| 6,351,775 B1 | 2/2002 | Yu |
| 6,353,449 B1 | 3/2002 | Gregg |
| 6,356,297 B1 | 3/2002 | Cheng |
| 6,370,560 B1 | 4/2002 | Robertazzi |
| 6,411,312 B1 | 6/2002 | Sheppard |
| 6,411,947 B1 | 6/2002 | Rice |
| 6,418,462 B1 | 7/2002 | Xu |
| 6,426,757 B1 | 7/2002 | Smith |
| 6,445,389 B1 | 9/2002 | Bossen |
| 6,452,593 B1 | 9/2002 | Challener |
| 6,462,760 B1 | 10/2002 | Cox, Jr. |
| 6,466,550 B1 | 10/2002 | Foster |
| 6,469,712 B1 | 10/2002 | Hilpert, Jr. |
| 6,473,085 B1 | 10/2002 | Brock |
| 6,473,597 B1 | 10/2002 | Johnson |
| 6,499,053 B1 | 12/2002 | Marquette |
| 6,505,208 B1 | 1/2003 | Kanevsky |
| 6,509,925 B1 | 1/2003 | Dermler |
| 6,510,429 B1 | 1/2003 | Todd |
| 6,525,731 B1 | 2/2003 | Suits |
| 6,529,932 B1 | 3/2003 | Dadiomov |
| 6,539,415 B1 | 3/2003 | Mercs |
| 6,539,421 B1 | 3/2003 | Appelman |
| 6,549,933 B1 | 4/2003 | Barrett |
| 6,567,109 B1 | 5/2003 | Todd |
| 6,567,813 B1 | 5/2003 | Zhu |
| 6,574,477 B1 | 6/2003 | Rathunde |
| 6,580,981 B1 | 6/2003 | Masood |
| 6,584,493 B1 | 6/2003 | Butler |
| 6,601,084 B1 | 7/2003 | Bhaskaran |
| 6,606,657 B1 | 8/2003 | Zilberstein |
| 6,618,751 B1 | 9/2003 | Challenger |
| 6,640,230 B1 | 10/2003 | Alexander |
| RE38,375 E | 12/2003 | Herzberg |
| 6,657,617 B2 | 12/2003 | Paolini |
| 6,657,642 B1 | 12/2003 | Bardon |
| 6,677,968 B1 | 1/2004 | Appelman |
| 6,684,255 B1 | 1/2004 | Martin |
| 6,691,162 B1 | 2/2004 | Wick |
| 6,714,967 B1 | 3/2004 | Horvitz |
| 6,717,600 B2 | 4/2004 | Dutta |
| 6,728,754 B1 | 4/2004 | Lipton |
| 6,734,884 B1 | 5/2004 | Berry |
| 6,754,904 B1 | 6/2004 | Cooper |
| 6,765,596 B2 | 7/2004 | Lection |
| 6,768,790 B1 | 7/2004 | Manduley |
| 6,781,607 B1 | 8/2004 | Benham |
| 6,801,930 B1 | 10/2004 | Dionne |
| 6,819,669 B2 | 11/2004 | Rooney |
| 6,832,239 B1 | 12/2004 | Kraft |
| 6,836,480 B2 | 12/2004 | Basso |
| 6,845,389 B1 | 1/2005 | Sen |
| 6,886,026 B1 | 4/2005 | Hanson |
| 6,938,213 B2 | 8/2005 | Brown |
| 6,941,236 B2 | 9/2005 | Huelsbergen |
| 6,948,168 B1 | 9/2005 | Kuprionas |
| RE38,865 E | 11/2005 | Dumarot |
| 6,970,929 B2 | 11/2005 | Bae |
| 6,993,596 B2 | 1/2006 | Hinton |
| 7,006,616 B1 | 2/2006 | Christofferson |
| 7,028,296 B2 | 4/2006 | Irfan |
| 7,062,533 B2 | 6/2006 | Brown |
| 7,089,266 B2 | 8/2006 | Stolte |
| 7,107,316 B2 | 9/2006 | Brown |
| 7,124,071 B2 | 10/2006 | Rich |
| 7,139,792 B1 | 11/2006 | Mishra |
| 7,143,409 B2 | 11/2006 | Herrero |
| 7,152,180 B2 | 12/2006 | Shoaib |

(56) References Cited

U.S. PATENT DOCUMENTS

| | | |
|---|---|---|
| 7,159,217 B2 | 1/2007 | Pulsipher |
| 7,185,067 B1 | 2/2007 | Viswanath |
| 7,209,137 B2 | 4/2007 | Brokenshire |
| 7,230,616 B2 | 6/2007 | Taubin |
| 7,249,123 B2 | 7/2007 | Elder |
| 7,263,511 B2 | 8/2007 | Bodin |
| 7,287,053 B2 | 10/2007 | Bodin |
| 7,305,438 B2 | 12/2007 | Christensen |
| 7,308,476 B2 | 12/2007 | Mannaru |
| 7,353,295 B1 | 4/2008 | Crow |
| 7,404,149 B2 | 7/2008 | Fox |
| 7,426,538 B2 | 9/2008 | Bodin |
| 7,427,980 B1 | 9/2008 | Partridge |
| 7,428,588 B2 | 9/2008 | Berstis |
| 7,429,987 B2 | 9/2008 | Leah |
| 7,436,407 B2 | 10/2008 | Doi |
| 7,439,975 B2 | 10/2008 | Hsu |
| 7,443,393 B2 | 10/2008 | Shen |
| 7,447,996 B1 | 11/2008 | Cox |
| 7,467,180 B2 | 12/2008 | Kaufman |
| 7,467,181 B2 | 12/2008 | McGowan |
| 7,475,354 B2 | 1/2009 | Guido |
| 7,478,127 B2 | 1/2009 | Creamer |
| 7,484,012 B2 | 1/2009 | Hinton |
| 7,503,007 B2 | 3/2009 | Goodman |
| 7,506,264 B2 | 3/2009 | Polan |
| 7,515,136 B1 | 4/2009 | Kanevsky |
| 7,525,964 B2 | 4/2009 | Astley |
| 7,552,177 B2 | 6/2009 | Kessen |
| 7,565,650 B2 | 7/2009 | Bhogal |
| 7,571,224 B2 | 8/2009 | Childress |
| 7,571,389 B2 | 8/2009 | Broussard |
| 7,580,888 B2 | 8/2009 | Ur |
| 7,590,984 B2 | 9/2009 | Kaufman |
| 7,596,596 B2 | 9/2009 | Chen |
| 7,640,587 B2 | 12/2009 | Fox |
| 7,667,701 B2 | 2/2010 | Leah |
| 7,698,656 B2 | 4/2010 | Srivastava |
| 7,702,784 B2 | 4/2010 | Berstis |
| 7,714,867 B2 | 5/2010 | Doi |
| 7,719,532 B2 | 5/2010 | Schardt |
| 7,719,535 B2 | 5/2010 | Tadokoro |
| 7,734,691 B2 | 6/2010 | Creamer |
| 7,737,969 B2 | 6/2010 | Shen |
| 7,743,095 B2 | 6/2010 | Goldberg |
| 7,747,679 B2 | 6/2010 | Galvin |
| 7,765,478 B2 | 7/2010 | Reed |
| 7,768,514 B2 | 8/2010 | Pagan |
| 7,773,087 B2 | 8/2010 | Fowler |
| 7,774,407 B2 | 8/2010 | Daly |
| 7,782,318 B2 | 8/2010 | Shearer |
| 7,792,263 B2 | 9/2010 | D Amora |
| 7,792,801 B2 | 9/2010 | Hamilton, II |
| 7,796,128 B2 | 9/2010 | Radzikowski |
| 7,808,500 B2 | 10/2010 | Shearer |
| 7,814,152 B2 | 10/2010 | McGowan |
| 7,827,318 B2 | 11/2010 | Hinton |
| 7,843,471 B2 | 11/2010 | Doan |
| 7,844,663 B2 | 11/2010 | Boutboul |
| 7,847,799 B2 | 12/2010 | Taubin |
| 7,856,469 B2 | 12/2010 | Chen |
| 7,873,485 B2 | 1/2011 | Castelli |
| 7,882,222 B2 | 2/2011 | Dolbier |
| 7,882,243 B2 | 2/2011 | Ivory |
| 7,884,819 B2 | 2/2011 | Kuesel |
| 7,886,045 B2 | 2/2011 | Bates |
| 7,890,623 B2 | 2/2011 | Bates |
| 7,893,936 B2 | 2/2011 | Shearer |
| 7,904,829 B2 | 3/2011 | Fox |
| 7,921,128 B2 | 4/2011 | Hamilton, II |
| 7,940,265 B2 | 5/2011 | Brown |
| 7,945,620 B2 | 5/2011 | Bou-Ghannam |
| 7,945,802 B2 | 5/2011 | Hamilton, II |
| 7,970,837 B2 | 6/2011 | Lyle |
| 7,970,840 B2 | 6/2011 | Cannon |
| 7,985,138 B2 | 7/2011 | Acharya |
| 7,990,387 B2 | 8/2011 | Hamilton, II |
| 7,996,164 B2 | 8/2011 | Hamilton, II |
| 8,001,161 B2 | 8/2011 | Finn |
| 8,004,518 B2 | 8/2011 | Fowler |
| 8,005,025 B2 | 8/2011 | Bodin |
| 8,006,182 B2 | 8/2011 | Bates |
| 8,013,861 B2 | 9/2011 | Hamilton, II |
| 8,018,453 B2 | 9/2011 | Fowler |
| 8,018,462 B2 | 9/2011 | Bhogal |
| 8,019,797 B2 | 9/2011 | Hamilton, II |
| 8,019,858 B2 | 9/2011 | Bauchot |
| 8,022,948 B2 | 9/2011 | Garbow |
| 8,022,950 B2 | 9/2011 | Brown |
| 8,026,913 B2 | 9/2011 | Garbow |
| 8,028,021 B2 | 9/2011 | Reisinger |
| 8,028,022 B2 | 9/2011 | Brownholtz |
| 8,037,416 B2 | 10/2011 | Bates |
| 8,041,614 B2 | 10/2011 | Bhogal |
| 8,046,700 B2 | 10/2011 | Bates |
| 8,051,462 B2 | 11/2011 | Hamilton, II |
| 8,055,656 B2 | 11/2011 | Cradick |
| 8,056,121 B2 | 11/2011 | Hamilton, II |
| 8,057,307 B2 | 11/2011 | Berstis |
| 8,062,130 B2 | 11/2011 | Smith |
| 8,063,905 B2 | 11/2011 | Brown |
| 8,070,601 B2 | 12/2011 | Acharya |
| 8,082,245 B2 | 12/2011 | Bates |
| 8,085,267 B2 | 12/2011 | Brown |
| 8,089,481 B2 | 1/2012 | Shearer |
| 8,092,288 B2 | 1/2012 | Theis |
| 8,095,881 B2 | 1/2012 | Reisinger |
| 8,099,338 B2 | 1/2012 | Betzler |
| 8,099,668 B2 | 1/2012 | Garbow |
| 8,102,334 B2 | 1/2012 | Brown |
| 8,103,640 B2 | 1/2012 | Lo |
| 8,103,959 B2 | 1/2012 | Cannon |
| 8,105,165 B2 | 1/2012 | Karstens |
| 8,108,774 B2 | 1/2012 | Finn |
| 8,113,959 B2 | 2/2012 | De Judicibus |
| 8,117,551 B2 | 2/2012 | Cheng |
| 8,125,485 B2 | 2/2012 | Brown |
| 8,127,235 B2 | 2/2012 | Haggar |
| 8,127,236 B2 | 2/2012 | Hamilton, II |
| 8,128,487 B2 | 3/2012 | Hamilton, II |
| 8,131,740 B2 | 3/2012 | Cradick |
| 8,132,235 B2 | 3/2012 | Bussani |
| 8,134,560 B2 | 3/2012 | Bates |
| 8,139,060 B2 | 3/2012 | Brown |
| 8,139,780 B2 | 3/2012 | Shearer |
| 8,140,340 B2 | 3/2012 | Bhogal |
| 8,140,620 B2 | 3/2012 | Creamer |
| 8,140,978 B2 | 3/2012 | Betzler |
| 8,140,982 B2 | 3/2012 | Hamilton, II |
| 8,145,676 B2 | 3/2012 | Bhogal |
| 8,145,725 B2 | 3/2012 | Dawson |
| 8,149,241 B2 | 4/2012 | Do |
| 8,151,191 B2 | 4/2012 | Nicol, II |
| 8,156,184 B2 | 4/2012 | Kurata |
| 8,165,350 B2 | 4/2012 | Fuhrmann |
| 8,171,407 B2 | 5/2012 | Huang |
| 8,171,408 B2 | 5/2012 | Dawson |
| 8,171,559 B2 | 5/2012 | Hamilton, II |
| 8,174,541 B2 | 5/2012 | Greene |
| 8,176,421 B2 | 5/2012 | Dawson |
| 8,176,422 B2 | 5/2012 | Bergman |
| 8,184,092 B2 | 5/2012 | Cox |
| 8,184,116 B2 | 5/2012 | Finn |
| 8,185,450 B2 | 5/2012 | McVey |
| 8,185,829 B2 | 5/2012 | Cannon |
| 8,187,067 B2 | 5/2012 | Hamilton, II |
| 8,199,145 B2 | 6/2012 | Hamilton, II |
| 8,203,561 B2 | 6/2012 | Carter |
| 8,214,335 B2 | 7/2012 | Hamilton, II |
| 8,214,433 B2 | 7/2012 | Dawson |
| 8,214,750 B2 | 7/2012 | Hamilton, II |
| 8,214,751 B2 | 7/2012 | Dawson |
| 8,217,953 B2 | 7/2012 | Comparan |
| 8,219,616 B2 | 7/2012 | Dawson |

(56) References Cited

U.S. PATENT DOCUMENTS

| | | |
|---|---|---|
| 8,230,045 B2 | 7/2012 | Kawachiya |
| 8,230,338 B2 | 7/2012 | Dugan |
| 8,233,005 B2 | 7/2012 | Finn |
| 8,234,234 B2 | 7/2012 | Shearer |
| 8,234,579 B2 | 7/2012 | Do |
| 8,239,775 B2 | 8/2012 | Beverland |
| 8,241,131 B2 | 8/2012 | Bhogal |
| 8,245,241 B2 | 8/2012 | Hamilton, II |
| 8,245,283 B2 | 8/2012 | Dawson |
| 8,265,253 B2 | 9/2012 | D Amora |
| 8,310,497 B2 | 11/2012 | Comparan |
| 8,334,871 B2 | 12/2012 | Hamilton, II |
| 8,360,886 B2 | 1/2013 | Karstens |
| 8,364,804 B2 | 1/2013 | Childress |
| 8,425,326 B2 | 4/2013 | Chudley |
| 8,442,946 B2 | 5/2013 | Hamilton, II |
| 8,506,372 B2 | 8/2013 | Chudley |
| 8,514,249 B2 | 8/2013 | Hamilton, II |
| 8,554,841 B2 | 10/2013 | Kurata |
| 8,607,142 B2 | 12/2013 | Bergman |
| 8,607,356 B2 | 12/2013 | Hamilton, II |
| 8,624,903 B2 | 1/2014 | Hamilton, II |
| 8,626,836 B2 | 1/2014 | Dawson |
| 8,692,835 B2 | 4/2014 | Hamilton, II |
| 8,721,412 B2 | 5/2014 | Chudley |
| 8,827,816 B2 | 9/2014 | Bhogal |
| 8,838,640 B2 | 9/2014 | Bates |
| 8,849,917 B2 | 9/2014 | Dawson |
| 8,911,296 B2 | 12/2014 | Chudley |
| 8,992,316 B2 | 3/2015 | Smith |
| 9,083,654 B2 | 7/2015 | Dawson |
| 9,152,914 B2 | 10/2015 | Haggar |
| 9,205,328 B2 | 12/2015 | Bansi |
| 9,286,731 B2 | 3/2016 | Hamilton, II |
| 9,299,080 B2 | 3/2016 | Dawson |
| 9,364,746 B2 | 6/2016 | Chudley |
| 9,525,746 B2 | 12/2016 | Bates |
| 9,583,109 B2 | 2/2017 | Kurata |
| 9,682,324 B2 | 6/2017 | Bansi |
| 9,764,244 B2 | 9/2017 | Bansi |
| 9,789,406 B2 | 10/2017 | Marr |
| 9,808,722 B2 | 11/2017 | Kawachiya |
| 2002/0065870 A1 | 5/2002 | Baehr-Jones |
| 2002/0068592 A1* | 6/2002 | Hutcheson ............ A63F 13/795 455/501 |
| 2002/0124137 A1 | 9/2002 | Ulrich |
| 2002/0161674 A1 | 10/2002 | Scheer |
| 2003/0008712 A1 | 1/2003 | Poulin |
| 2003/0033349 A1 | 2/2003 | Lambert |
| 2003/0046421 A1 | 3/2003 | Horvitz |
| 2003/0052915 A1 | 3/2003 | Brown |
| 2003/0055892 A1 | 3/2003 | Huitema |
| 2003/0055908 A1 | 3/2003 | Brown |
| 2003/0056002 A1 | 3/2003 | Trethewey |
| 2003/0115317 A1 | 6/2003 | Hickson |
| 2003/0135621 A1 | 7/2003 | Romagnoli |
| 2003/0177187 A1 | 9/2003 | Levine |
| 2004/0014514 A1 | 1/2004 | Yacenda |
| 2004/0103079 A1 | 5/2004 | Tokusho |
| 2004/0210627 A1 | 10/2004 | Kroening |
| 2004/0228291 A1 | 11/2004 | Huslak |
| 2004/0244006 A1 | 12/2004 | Kaufman |
| 2004/0254993 A1 | 12/2004 | Mamas |
| 2005/0015571 A1 | 1/2005 | Kaufman |
| 2005/0246711 A1 | 11/2005 | Berstis |
| 2008/0132336 A1* | 6/2008 | Kobayashi ............... A63F 13/12 463/42 |
| 2008/0270605 A1 | 10/2008 | Berstis |
| 2008/0301405 A1 | 12/2008 | Kaufman |
| 2009/0113448 A1 | 4/2009 | Smith |
| 2014/0344725 A1 | 11/2014 | Bates |
| 2015/0238872 A1* | 8/2015 | Gary ....................... A63F 13/12 463/42 |
| 2015/0352451 A1* | 12/2015 | Brenden ................. A63F 13/86 463/31 |
| 2016/0191671 A1 | 6/2016 | Dawson |

FOREIGN PATENT DOCUMENTS

| | | |
|---|---|---|
| CA | 2143874 | 6/2000 |
| CA | 2292678 | 7/2005 |
| CA | 2552135 | 7/2013 |
| CN | 1334650 A | 2/2002 |
| CN | 1202652 C | 10/2002 |
| CN | 1141641 C | 3/2004 |
| CN | 1494679 A | 5/2004 |
| CN | 1219384 | 9/2005 |
| CN | 1307544 | 3/2007 |
| CN | 100407675 | 7/2008 |
| CN | 100423016 C | 10/2008 |
| CN | 100557637 | 11/2009 |
| CN | 101001678 B | 5/2010 |
| CN | 101436242 | 12/2010 |
| CN | 101801482 B | 12/2014 |
| EP | 668583 | 8/1995 |
| EP | 0627728 B1 | 9/2000 |
| EP | 0717337 B1 | 8/2001 |
| EP | 1207694 A2 | 5/2002 |
| EP | 0679977 B1 | 10/2002 |
| EP | 0679978 B1 | 3/2003 |
| EP | 0890924 B1 | 9/2003 |
| EP | 1377902 B1 | 8/2004 |
| EP | 0813132 B1 | 1/2005 |
| EP | 1380133 B1 | 3/2005 |
| EP | 1021021 B1 | 9/2005 |
| EP | 0930584 B1 | 10/2005 |
| EP | 0883087 B1 | 8/2007 |
| EP | 1176828 B1 | 10/2007 |
| EP | 2076888 B1 | 7/2015 |
| GB | 2339938 | 10/2002 |
| GB | 2352154 | 7/2003 |
| JP | H11191097 A | 4/1999 |
| JP | 11191097 | 7/1999 |
| JP | 3033956 B2 | 4/2000 |
| JP | 3124916 B2 | 1/2001 |
| JP | 3177221 B2 | 6/2001 |
| JP | 2001204973 A | 7/2001 |
| JP | 3199231 B2 | 8/2001 |
| JP | 3210558 B2 | 9/2001 |
| JP | 3275935 | 2/2002 |
| JP | 3361745 | 1/2003 |
| JP | 3368188 B2 | 1/2003 |
| JP | 3470955 B | 9/2003 |
| JP | 3503774 | 12/2003 |
| JP | 3575598 | 7/2004 |
| JP | 3579823 B | 7/2004 |
| JP | 3579154 B2 | 10/2004 |
| JP | 3701773 B2 | 10/2005 |
| JP | 3777161 | 3/2006 |
| JP | 3914430 B | 2/2007 |
| JP | 3942090 B | 4/2007 |
| JP | 3962361 | 5/2007 |
| JP | 4009235 B | 9/2007 |
| JP | 4225376 | 12/2008 |
| JP | 4653075 | 12/2010 |
| JP | 5063698 B | 8/2012 |
| JP | 5159375 B2 | 3/2013 |
| JP | 5352200 B2 | 11/2013 |
| JP | 5734566 B2 | 6/2015 |
| KR | 20020038229 A | 5/2002 |
| KR | 20030039019 A | 5/2003 |
| MY | 117864 A | 8/2004 |
| SG | 55396 | 12/1998 |
| TW | 424213 | 3/2001 |
| TW | 527825 | 4/2003 |
| TW | 200836091 | 9/2008 |
| TW | 200937926 | 9/2009 |
| TW | 201002013 | 1/2010 |
| TW | 201009746 | 3/2010 |
| TW | 201024997 | 7/2010 |

(56) References Cited

FOREIGN PATENT DOCUMENTS

| TW | 201028871 |    | 8/2010  |
|----|-----------|----|---------|
| WO | 0203645   | A2 | 1/2002  |
| WO | 2002073457|    | 9/2002  |
| WO | 20020087156|   | 10/2002 |
| WO | 03049459  | A1 | 6/2003  |
| WO | 03058518  | A2 | 7/2003  |
| WO | 2004086212|    | 10/2004 |
| WO | 2005079538|    | 9/2005  |
| WO | 2007101785|    | 9/2007  |
| WO | 2008037599|    | 4/2008  |
| WO | 2008074627|    | 6/2008  |
| WO | 2008095767|    | 8/2008  |
| WO | 2009037257|    | 3/2009  |
| WO | 2009104564|    | 8/2009  |
| WO | 2010096738| A1 | 8/2010  |

OTHER PUBLICATIONS

International Search Report as Published as WO2005/079538 in corresponding international application No. PCT/US2005/005550. dated Jul. 5, 2006.

Duong et al; "A dynamic load sharing algorithm for massivly multiplayer online games" published Sep. 28, 2003-Oct. 1, 2003. http://ieeexplore.ieee.org/iel5/8945/28322/01266179.pdf?tp=&arnumber-=1266179&isnumber=28322http://ieeexplore.ieee.org/xpl/absprintf.jsp?arnumb- er=1266179.

Mauve, M., Fischer, S., and Widmer, J. 2002. A generic proxy system for networked computer games. In Proceedings of the 1st Workshop on Network and System Support for Games (Braunschweig, Germany, Apr. 16-17, 2002). NetGames '02. ACM, New York, NY, 25-28. DOI=http://doi.acm.org/10.1145/566500.566504.

IBM developer Works, OptimalGrid—autonomic computing on the Grid, James H. Kaufman; Tobin J. Lehman; Glenn Deen; and John Thomas, Jun. 2003.

IBM, Transcoding: Extending e-business to new environments, Britton et al., Sep. 22, 2000.

Lee et al., "A Self-Adjusting Data Distribution Mechanism for Multidimensional Load Balancing in Multiprocessor-Based Database Systems," Information Systems vol. 19, No. 7, pp. 549-567, 1994.

Ma et al., "A Scalable Parallel Cell-Projection Volume Rendering Algorithm for Three-Dimensional Unstructured Data", IEEE 1997, pp. 1-10.

Feng et al., "A Parallel Hierarchical Radiosity Algorithm for Complex Scenes," Proceedings IEEE Symposium on Parallel Rendering (PRS) '97), IEEE Computer Society Technical Committee on Computer Graphics in cooperation with ACM SIGGRAPH pp. 71-79, 1997.

Hassen et al., "A Task-and Data-Parallel Programming Language Based on Shared Objects," ACM Transactions on Programming Languages and Systems, vol. 20, No. 6, Nov. 1998, pp. 1131-1170.

Andert, "A Simulation of Dynamic Task Allocation in a Distributed Computer System," Proceedings of the 1987 Winter Simulation Conference, 1987, pp. 1-9.

\* cited by examiner

SYSTEM AND METHOD FOR GENERATING PERSONALIZED MESSAGING CAMPAIGNS FOR VIDEO GAME PLAYERS

CROSS-REFERENCE TO RELATED APPLICATIONS

This application claims priority to U.S. Provisional Patent Application Ser. No. 62/238,938, filed Oct. 8, 2015, which is hereby incorporated herein by reference in its entirety.

FIELD OF THE INVENTION

The field of the invention relates generally to video games, and more particularly to a system and method for generating personalized messaging campaigns for video game players.

BACKGROUND OF THE INVENTION

Video games are appealing to an increasingly broader audience of players. Indeed, a wide variety of gamers of all ages and backgrounds play games on, for example, Personal Computers (PCs), video game consoles, and/or mobile phones.

Given the breadth of video game genres and the sheer number of video games that are available, video game developers and publishers are faced with challenges associated with attracting and retaining gamers. As one example, gamers span all skill levels from beginner through expert. Novice gamers may have a lack of skill and/or knowledge about game protocol, rules, etc. and may get frustrated easily, and even quit games quickly. Expert gamers, by contrast, may become bored too quickly, and continually seek out additional challenges and content to stay engaged. In either scenario, dissatisfaction may occur leading to a poor experience for gamers.

Because every gamer is different, and because different gamers are motivated in different ways, it may be desirable to personalize the game experience for each player, to the extent possible, to keep them engaged and satisfied. More particularly, it may be desirable to provide video game players with communications concerning gameplay tips, techniques, and/or strategy information, along with promotions, offers, news, etc. that may be relevant to them. Currently, however, mass communications directed at gamers often provide video game players with boilerplate electronic messages that may not be relevant to all recipients, thereby limiting their effectiveness. Attempts at providing customized communications to individual players often involve one or more manual processes, which can prove tedious and/or impractical. These and other drawbacks exist.

SUMMARY OF THE INVENTION

The invention addressing these and other drawbacks relates to a system and method for generating personalized messaging campaigns for video game players.

According to an aspect of the invention, a game player's profile data and/or behavioral data may be used to create a customized messaging campaign for the player. The messaging campaign (which may also be referred to herein as a customized "treatment") may comprise one or more messages, each selected from a variety of message types, that may be delivered to a game player through one or more channels, at predetermined time intervals.

A customized messaging campaign created for a game player may be focused on (or relevant to) a particular video game (e.g., "Call of Duty®," the first-person shooter video game franchise published by Activision Publishing, Inc.), or series of video games, whether related to one another (e.g., in the same video game genre, or published by the same video game publisher), or not. The invention may be applicable to any genre of video game including, without limitation, first-person shooters, racing games, action-adventure games, role-playing or fantasy games, music or rhythm games, sports games, educational games, and the like. Moreover, the invention may be applicable to games played on a variety of platforms (e.g., PCs, video game consoles, mobile phones, etc.), with any number of players (e.g., single player or multiplayer video games).

As used herein, messages may comprise any communications with a video game player, whether in an electronic or non-electronic format, through one or more channels. For example, messages may be provided to a player via one or more in-game channels including, without limitation, pop-up windows, chat messages, messages from characters in the video game, messages displayed on objects in the video game, or via other in-game channels.

Additionally, messages may be provided to a game player via one or more channels external to (or outside of) a video game including, without limitation, messages in mobile applications external to a video game, Short Messaging Service (SMS) or Multimedia Messaging Service (MMS) messages, emails, messages on a website associated with a video game (e.g., messages to a website that maintains a user forum for users of the video game), traditional mail, or via other external channels.

Message types may include, for example, gameplay tips, techniques, strategy information, news, awards, milestones, promotions relating to microtransactions or downloadable content (e.g., offers, discounts, etc.), overviews of new products, features, etc., or other message types. Any number of predefined messages may exist (e.g., tens, hundreds, thousands, etc.) for each message type.

As noted above, in one implementation, a messaging campaign may be customized for a gamer based on his or her player (or user) profile. A player profile may comprise any number of attributes about a player such as, for example, screen name (or gamer tag), demographic information of the player (e.g., geographic location, age, gender, income level, etc.), style of gameplay (e.g., aggressive), a role preference (e.g., an explicit indication by the player of such preference), a role actually played, a duration of gameplay sessions, a number of gameplay sessions played by the player in a given login session, in-game items used or purchased by the player, membership in a clan or team, preference to play with clan mates or friends, experience level, win/loss records, winning percentage, scores (highest, lowest, etc.), and/or other attributes or information without limitation. Game-related purchases may include an acquisition by a player of an item in exchange for a fee, such as a real currency fee, a virtual currency fee, and/or other type of fee. The item may include an in-game item (e.g., a power-up, virtual weaponry, a virtual vehicle, an extra life, an extended life, etc.), a new level or map, and/or other item that may be used in relation to a game.

Additionally or alternatively, a messaging campaign may be customized for a gamer based on his or her behavioral data. Behavioral data may include any data used to determine or infer, among other things, a player's level of interest or satisfaction with a game. It may be stored as part of a player profile, or stored separately and associated with a player or player profile. Behavioral data may also include or overlap with a number of attributes stored in a player profile. Examples of behavioral data may include, for example, in-game actions, duration of gameplay sessions, frequency of gameplay sessions, number of games quit, game-related purchases made by the player, style of gameplay, experience level, etc. As an example, if a novice player quits a predetermined number of games in a row (e.g., three), it may indicate frustration or a lack of skill and/or knowledge about game protocol, rules, etc. On the other hand, if an expert gamer quits a predetermined number of games in a row, it may indicate a level of boredom with the game.

In one implementation of the invention, a game player may be grouped or categorized together with one or more other game players in a user classification (or segment) based on one or more common player profile attributes, and/or one or more behavioral data characteristics. Examples of user classifications may include, but are not limited to, classifications based on common in-game actions, classifications based on common out-of-game actions, classifications based on common experience levels (e.g., experience levels in a specific video game, experience levels in a given genre of video games, general experience levels regarding video games, etc.), classifications based on common likelihood of purchasing supplemental content (e.g., game-related purchases), etc.

A customized treatment (or messaging campaign) may be crafted for a player based on the player profile data, behavioral data, and/or user classification referenced above. The customized treatment may comprise some number of predefined messages of varying message types particularly relevant to the player.

According to an aspect of the invention, a customized treatment (or messaging campaign) may commence upon the occurrence (or detection) of a trigger. A trigger may comprise any situation, occurrence, event, action, or property related to a video game.

In one implementation, triggers may comprise in-game triggers. In-game triggers may include, but are not limited to, a player achieving a certain level or objective in a game, a player winning or losing a predetermined number of games in a row, a player performing a certain action in a game (e.g., quitting, shooting one's own teammate, achieving a specific kill/death ("K/D") ratio, etc.), a player making one or more in-game purchases, etc.

Triggers may also comprise triggers external to gameplay. Examples of external triggers may include, for example, a certain date, a time, the occurrence of a given event (e.g., the release of a new game or game peripheral or accessory, the release of supplemental game content, a holiday sale, a clearance sale, etc.), or other situation, occurrence, event, action, or property occurring external to gameplay.

In one implementation of the invention, triggers may further comprise scheduled triggers based on, for example, attributes of a player profile, or other data. For instance, an administrator or other user may decide to trigger a messaging campaign for gamers that satisfy certain demographic criteria (e.g., based on gender, age, geographic location) or other player profile criteria.

An example treatment (or campaign) for a particular trigger (e.g., a holiday sale or a user reaching a certain achievement) may define some predefined number of allocations, each allocation specifying some number of messages (e.g., two, five, ten) of a particular message type to send to the game player. The particular messages allocated to the treatment may be selected from a database of predefined messages. Each predefined message can be scored for relevancy to a particular game player using the message's scoring formula. Generally, a message's scoring formula takes as input certain target values relating to a game player (e.g., data points from the player's profile and/or behavioral data) and outputs a relevancy score indicating the message's relevancy to the game player. For example, a message advertising a sale on sniper weapons may have a scoring formula that considers the frequency with which a game player plays as a sniper character. In other words, the more frequently a game player uses sniper characters, the more relevant the message is to the player.

In some implementations, the messages relevancy scores are used to rank the messages and determine which messages are communicated to the game player. Further, a treatment's allocation may define a threshold score such that messages with relevancy scores below the threshold score will not be communicated to the game player.

According to an aspect of the invention, a targeting application may generate various interfaces that enable administrative users (or other individuals) associated with video game developers, publishers, marketers, or other entities to create messaging campaigns for one or more video games by, among other things, defining triggers, creating a number of predefined messages for various message types, assigning players to user classifications, generating one or more allocation series, and performing other operations.

One advantage of the invention is that gamers may be provided with personalized messages that are relevant to them based on their player profile data, behavioral data, and/or user classification. In this regard, players may receive meaningful content designed to foster enjoyment of a video game.

As a first non-limiting example, one trigger may comprise a holiday sale, and the corresponding messaging campaign may comprise a five message campaign. A first gamer that is a frequent player, high level gamer, and that makes frequent in-game purchases (e.g., the total spend over a predetermined time period meets or exceeds a certain threshold) may receive one advanced gameplay tip and four microtransaction discounts, with each message having a relevancy score particular to the first gamer meeting or exceeding certain predefined thresholds. A second gamer that is a new player, low level gamer, and a non-spender, may receive three basic gameplay tips, one news update, and one message regarding a new product and/or new feature overview, with each message having a relevancy score particular to the second gamer meeting or exceeding certain predefined thresholds.

As a second non-limiting example, a trigger may comprise a user prematurely quitting three games in a row, and the corresponding messaging campaign may comprise a four message campaign. For a first gamer that is a high level gamer with declining game play, quitting three games in a row prematurely may indicate boredom and/or dissatisfaction. As such, the messaging campaign may try to foster engagement, and may comprise two microtransaction coupons, one news article, and one message regarding a new product and/or new feature overview, with each message having a relevancy score particular to the first gamer meeting or exceeding certain predefined thresholds. By contrast, for a second gamer that is a low level, beginning gamer, quitting three games in a row prematurely may indicate a lack of skill or knowledge about game protocol or rules. Accordingly, the messaging campaign may comprise three instructional tips and one message regarding a new product and/or new feature overview, with each message having a relevancy score particular to the second gamer meeting or exceeding certain predefined thresholds. Countless numbers of additional examples exist.

Another advantage of the invention is that video game developers and publishers may utilize data acquired about players that play their games in an actionable way to attract new gamers and build brand loyalty by retaining existing gamers.

These and other objects, features, characteristics, and advantages of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION OF THE INVENTION

The invention described herein relates to a system and method for generating personalized messaging campaigns for video game players.

According to an aspect of the invention, and as described in greater detail herein, a game player's profile data and/or behavioral data may be used to create a customized messaging campaign for the player. The messaging campaign may comprise one or more messages, each selected from a variety of message types, which may be delivered to a game player through one or more channels, at predetermined time intervals.

Exemplary System Architecture

Figure 1A:
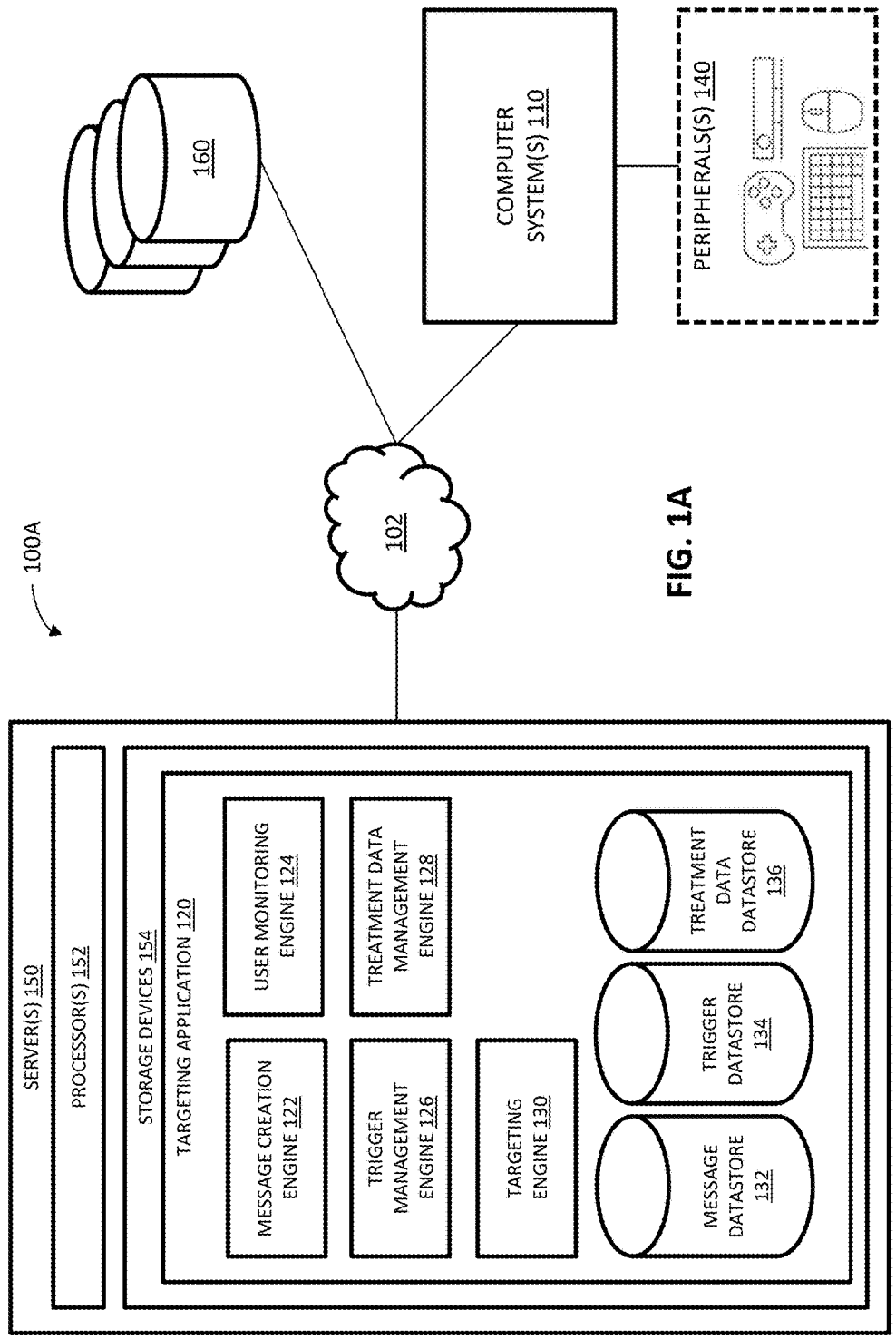
FIG. 1A illustrates an exemplary system for generating personalized messaging campaigns for video game players, according to an aspect of the invention.
Figure 1B:
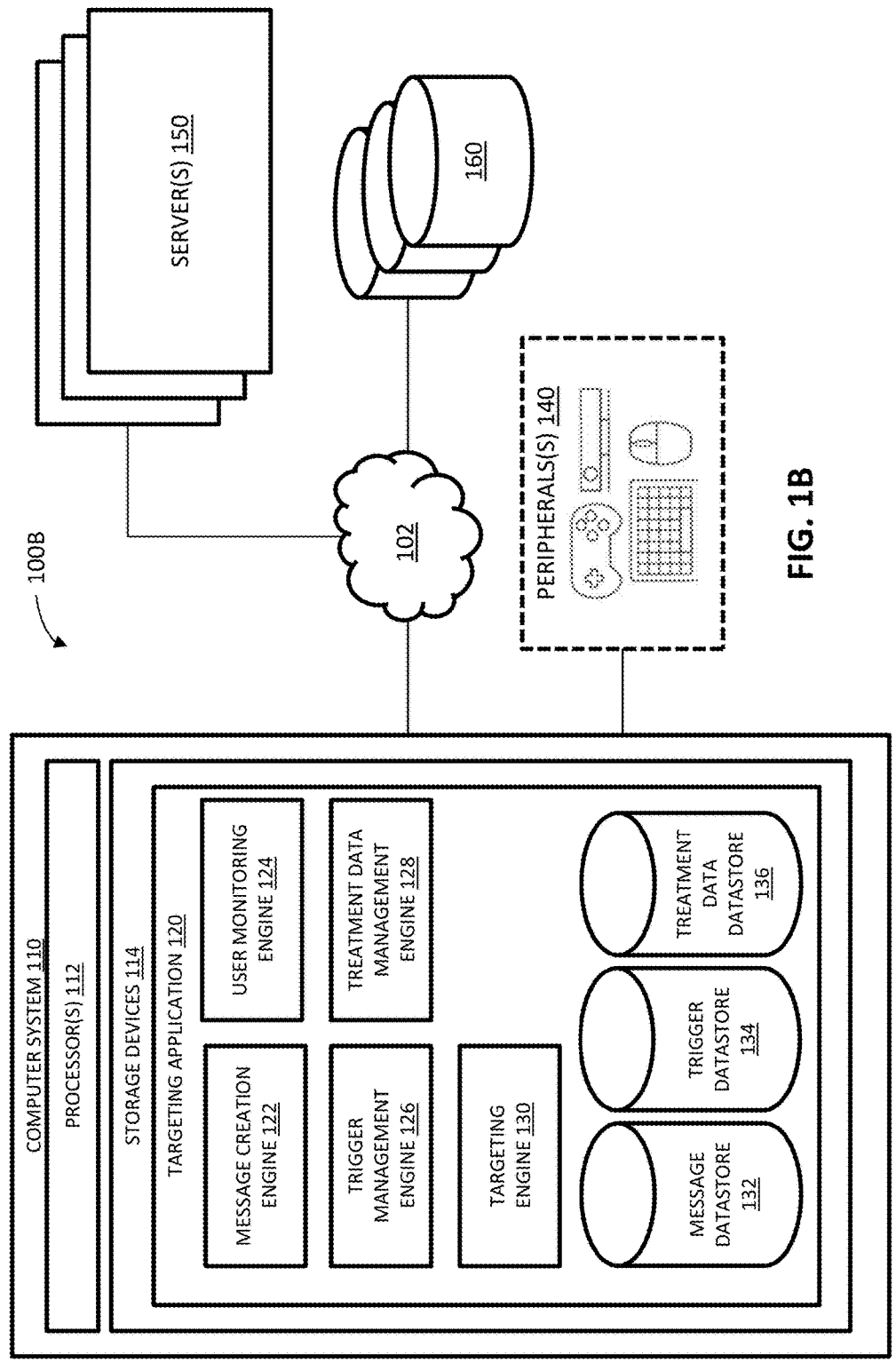
FIG. 1B illustrates an exemplary system for generating personalized messaging campaigns for video game players, according to an aspect of the invention.

FIGS. 1A and 1B each depict an exemplary architecture of a system (100A, 100B) which may include one or more computer systems 110, one or more servers 150, one or more databases 160, and/or other components.

FIG. 1A illustrates an implementation in which server(s) 150 function as a host computer that hosts gameplay between (or with) other devices, such as computer system(s) 110.

FIG. 1B illustrates an implementation in which a given computer system 110 functions as a host computer that hosts gameplay between (or with) other devices, such as other computer system(s) 110. Unless specifically stated otherwise, the description of various system components may refer to either or both of FIGS. 1A and 1B.

Server 150

Server 150 may include one or computing devices. Referring to FIG. 1A, server 150 may include one or more physical processors 152 (also interchangeably referred to herein as processors 152, processor(s) 152, or processor 152 for convenience) programmed by computer program instructions, one or more storage devices 154 (which may store a targeting application 120), and/or other components. Processors 152 may be programmed by one or more computer program instructions. For example, processors 152 may be programmed by gaming instructions used to instantiate a game.

Depending on the system configuration, a targeting application 120 (or portions thereof) may be part of a video game application, which creates a game instance to facilitate gameplay. Alternatively or additionally, portions or all of targeting application 120 may run on server 150 or computer system 110. Targeting application 120 is described in additional detail herein.

Computer System 110

Computer system 110 may be configured as a gaming console, a handheld gaming device, a personal computer (e.g., a desktop computer, a laptop computer, etc.), a smartphone, a tablet computing device, and/or other device that can be used to interact with an instance of a video game.

Referring to FIG. 1B, computer system 110 may include one or more processors 112 (also interchangeably referred to herein as processors 112, processor(s) 112, or processor 112 for convenience), one or more storage devices 114 (which may store a message targeting application 120), one or more peripherals 140, and/or other components. Processors 112 may be programmed by one or more computer program instructions. For example, in one implementation, processors 112 may be programmed by targeting application 120 and/or other instructions (such as gaming instructions used to instantiate the video game).

Although each is illustrated in FIGS. 1A and 1B as a single component, server 150 and computer system 110 may each include a plurality of individual components (e.g., computer devices), each programmed with at least some of the functions described herein. In this manner, some components of server 150 and/or computer system 110 may perform some functions while other components may perform other functions, as would be appreciated. The one or more processors (152, 112) may each include one or more physical processors that are programmed by computer program instructions. The various instructions described herein are exemplary only. Other configurations and numbers of instructions may be used, so long as the processor(s) (152, 112) are programmed to perform the functions described herein.

Furthermore, it should be appreciated that although the various instructions are illustrated in FIGS. 1A and 1B as being co-located within a single processing unit, in implementations in which processor(s) (152, 112) include multiple processing units, one or more instructions may be executed remotely from the other instructions.

The description of the functionality provided by the different instructions described herein is for illustrative purposes, and is not intended to be limiting, as any of instructions may provide more or less functionality than is described. For example, one or more of the instructions may be eliminated, and some or all of its functionality may be provided by other ones of the instructions. As another example, processor(s) (152, 112) may be programmed by one or more additional instructions that may perform some or all of the functionality attributed herein to one of the instructions. Further, as noted above, either or both server 150 and computer system 110 may function as a host computer programmed by targeting application 120.

Peripherals 140

Peripherals 140 may be used to obtain an input (e.g., direct input, measured input, etc.) from a player. Peripherals 140 may include, without limitation, a game controller, a gamepad, a keyboard, a mouse, an imaging device such as a camera, a motion sensing device, a light sensor, a biometric sensor, and/or other peripheral device that can obtain an input from a player. Peripherals 140 may be coupled to a corresponding computer system 110 via a wired and/or wireless connection.

Storage Devices (154, 114)

The various instructions described herein may be stored in one or more storage devices, such as storage devices (154, 114) which may comprise random access memory (RAM), read only memory (ROM), and/or other memory. The storage device may store the computer program instructions (e.g., the aforementioned instructions) to be executed by processor (152, 112) as well as data that may be manipulated by processor (152, 112). The storage device may comprise floppy disks, hard disks, optical disks, tapes, or other storage media for storing computer-executable instructions and/or data.

Network 102

The various components illustrated in FIGS. 1A-1B may be coupled to at least one other component via a network, which may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network.

Databases 160

The various databases 160 described herein may be, include, or interface to, for example, an Oracle™ relational database sold commercially by Oracle Corporation. Other databases, such as Informix™, DB2 (Database 2) or other data storage, including file-based, or query formats, platforms, or resources such as OLAP (On Line Analytical Processing), SQL (Structured Query Language), a SAN (storage area network), Microsoft Access™ or others may also be used, incorporated, or accessed. Database 160 may comprise one or more such databases that reside in one or more physical devices and in one or more physical locations. Database 160 may store a plurality of types of data and/or files and associated data or file descriptions, administrative information, or any other data.

In FIGS. 1A-1B, as well as in other drawing Figures, different numbers of entities than those depicted may be used. Furthermore, according to various implementations, the components described herein may be implemented in hardware and/or software that configure hardware. Accordingly, the foregoing system architecture is exemplary only and should not be viewed as limiting. Other system configurations may be used as well, as would be appreciated by those having skill in the art.

Exemplary Multiplayer System Configurations

Multiplayer video games have exploded in popularity due, in part, to services such as Microsoft's Xbox LIVE® and Sony's PlayStation Network® which enable gamers all over the world to play with or against one another. Generally, a multiplayer video game is a video game in which two or more players play in a gameplay session in a cooperative or adversarial relationship. Typically, when a player logs in to a video game system or platform to play a multiplayer video game, the player may engage in a gameplay session in which he or she is matched with other players to play together (on the same team or as opponents).

Figure 2A:
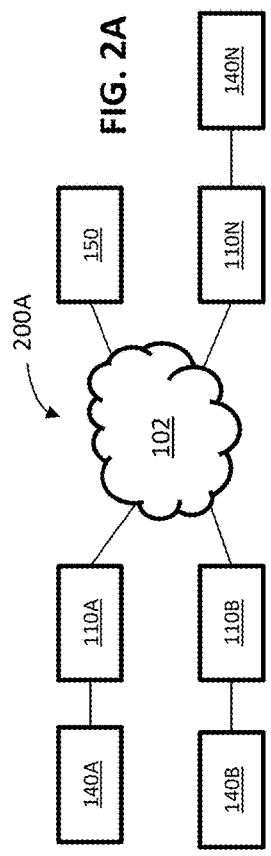
FIG. 2A illustrates an exemplary system configuration in which a server hosts a plurality of computer devices to facilitate a multiplayer game, according to an aspect of the invention.

FIG. 2A illustrates an exemplary system configuration 200A in which a server hosts a plurality of computer devices to facilitate a multiplayer game, according to an implementation of the invention. In one implementation, one or more servers 150 may host a number of computer systems 110 (illustrated as computer systems 110A, 110B, . . . , 110N) via a network 102. Each of the computer systems 110 may include one or more peripherals (illustrated as peripherals 140A, 140B, . . . , 140N). In this manner, one or more servers 150 may facilitate the gameplay of different players using different computer systems 110 and/or otherwise provide one or more operations of message targeting application 120 (illustrated in FIG. 1).

In some instances, a given server 150 may be associated with a proprietary gameplay network system, such as, without limitation, Microsoft's Xbox LIVE® and Sony's PlayStation Network®, and/or another type of gameplay network system. In this implementation, a given one of the computer systems 110 may be associated with a particular type of gaming console. Other types of computer systems 110 using other types of gameplay networks may be used as well.

Figure 2B:
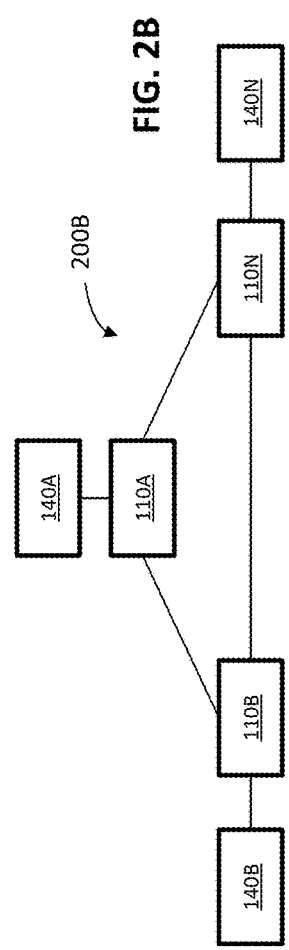
FIG. 2B illustrates an exemplary system configuration in which a plurality of networked servers communicate with one another to facilitate a multiplayer game, according to an aspect of the invention.

FIG. 2B illustrates an exemplary system configuration 200B in which a plurality of computer systems 110 are networked together to facilitate a multiplayer game, according to an implementation of the invention. Any one or more of the computer systems 110 may serve as a host and/or otherwise provide one or more operations of message targeting application 120 (illustrated in FIG. 1).

Figure 2C:
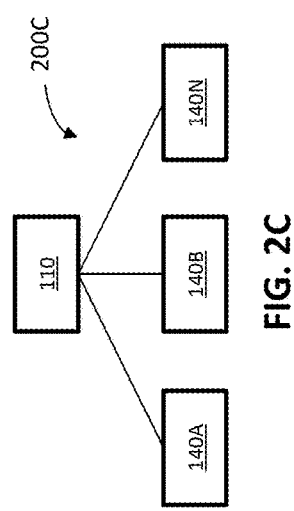
FIG. 2C illustrates an exemplary system configuration in which a plurality of computer devices are networked together to facilitate a multiplayer game, according to an aspect of the invention.

FIG. 2C illustrates an exemplary system configuration 200C in which one of the computer systems 110 is used by a plurality of users to facilitate a multiplayer game, according to an implementation of the invention. In an implementation, one of the computer systems 110 may be considered to host the multiplayer game and/or otherwise provide one or more operations of message targeting application 120 (illustrated in FIG. 1).

Referring to FIGS. 2A-2C, in an implementation, a host may facilitate the multiplayer game and/or perform other operations described herein. In an implementation, at least some of these operations may also or instead be performed by an individual one of the computer systems 110. Furthermore, the illustrated system configurations are exemplary only and should not be viewed as limiting in any way. Other system configurations may be used as well, as would be appreciated by those having skill in the art.

Targeting Application 120

According to an aspect of the invention, with reference to FIGS. 1A-1B, targeting application 120 may include instructions that program server 150 and/or computer system 110, as noted above. The instructions may include, without limitation, a message creation engine 122, a user monitoring engine 124, a trigger management engine 126, a treatment data management engine 128, a targeting engine 130, a message datastore 132, a trigger datastore 134, a treatment data datastore 136, or other engines or datastores.

As used herein, for convenience, the various instructions will be described as performing an operation, when, in fact, the various instructions program the processors (152, 112) to perform the operation. Further, in some implementations, one or more engines may be combined while, in other implementations, one or more engines may not be necessary. Likewise, one or more datastores may combined in some implementations, and omitted in others. Moreover, in some implementations, the various datastores may be separate from, but accessible by, targeting application 120. It should further be recognized that descriptions of various features and functionality herein that are attributed to targeting application 120 may refer to one or more of the engines and/or datastores comprising targeting application 120.

According to an aspect of the invention, message creation engine 122 may be configured to manage creation of varying message types (message templates) and messages based on those message types. In some implementations, message creation engine 122 may include text entry modules that enable entry of portions of message types or messages (e.g., message subjects, message bodies, etc.). Message creation engine 122 may receive information about a message type or message to be created from targeting engine 130. Message creation engine 122 may store created message types and messages in message datastore 132. In various implementations, messages created by message creation engine 122 may comprise a predefined set of messages, as discussed further herein. As previously noted, message types may include, for example, gameplay tips, techniques, strategy information, news, awards, milestones, promotions relating to microtransactions or downloadable content (e.g., offers, discounts, etc.), overviews of new products, features, etc., or other message types.

User monitoring engine 124 may be configured to identify, monitor, or otherwise access player profiles and/or behavioral data for game players. As previously noted, a player profile may comprise any number of attributes about a player such as, for example, screen name (or gamer tag), demographic information of the player (e.g., geographic location, age, gender, income level, etc.), style of gameplay (e.g., aggressive), a role preference (e.g., an explicit indication by the player of such preference), a role actually played, a duration of gameplay sessions, a number of gameplay sessions played by the player in a given login session, in-game items used or purchased by the player, membership in a clan or team, preference to play with clan mates or friends, experience level, win/loss records, winning percentage, scores (highest, lowest, etc.), and/or other attributes or information without limitation.

Examples of behavioral data may include, for example, in-game actions, duration of gameplay sessions, frequency of gameplay sessions, number of games quit, game-related purchases made by the player, style of gameplay, experience level, etc. In one implementation, user monitoring engine may obtain gameplay state information captured by, for example, an event log engine.

Trigger management engine 126 may be configured to monitor operating systems, processes, applications, and/or other resources of computer system(s) 110, server(s) 150, and/or other system components for the occurrence (or detection) of triggers. As described above, triggers may comprise any situation, occurrence, event, action, or property related to a video game. Trigger management engine 126 may also implement processes that monitor in-game actions for triggers. Trigger management engine 126 may further implement processes that monitor user account actions (logging on, logging out, identifying relationships to other accounts, etc.) related to video game players' accounts. Processes implemented by trigger management engine 126 may compare situations, occurrences, actions, etc. of computer system(s) 110, server(s) 150, and/or other system components with situations, occurrences, events, actions, or properties, etc. represented in data structures stored in trigger datastore 134.

According to an aspect of the invention, treatment data management engine 128 may be configured to obtain user classifications from targeting engine 130, and to obtain user treatment grids associated with the user classifications from treatment data datastore 136. In various implementations, treatment data management engine 128 may provide targeting engine 130 with particular electronic messages for certain user classifications. Treatment data management engine 128 may further provide targeting engine 130 with specific channels (e.g., in-game channels, out-of-game channels, etc.) for the electronic messages.

Targeting engine 130 may be configured to generate various interfaces that enable administrative users (or other individuals) associated with video game developers, publishers, marketers, or other entities to create messaging campaigns for one or more video games by, among other things, defining triggers, creating a number of predefined messages for various message types, defining user classifications, assigning players to user classifications, generating one or more allocation series, and performing other operations.

Message datastore 132 may be configured to store a set of predefined electronic messages. The messages may correspond to a variety of formats, such as formats corresponding to in-game messages and out-of-game messages. In some implementations, the messages may include electronic messages of varying message types including, but not limited to, gameplay tips, techniques, strategy information, news, awards, milestones, promotions relating to microtransactions or downloadable content (e.g., offers, discounts, etc.), overviews of new products, features, etc., or other message types. Each message type defines the parameters of messages of that type. Any number of predefined messages may exist (e.g., tens, hundreds, thousands, etc.) for each message type.

Trigger datastore 134 may be configured to store data structures that represent triggers. The structures in trigger datastore 134 may uniquely identify situations, occurrences, events, actions, or properties related to video games that form the basis for triggers. In some implementations, the data structures in trigger datastore 134 may comprise one or more tables indexed by identifiers corresponding to situations, occurrences, events, actions, or properties related to video games that form the basis for triggers.

Examples of in-game triggers may include, but are not limited to, a player achieving a certain level or objective in a game, a player winning or losing a predetermined number of games in a row, a player performing a certain action in a game (e.g., quitting, shooting one's own teammate, achieving a specific kill/death ("KID") ratio, etc.), a player making one or more in-game purchases, etc.

Examples of triggers external to gameplay may include, for example, a certain date, a time, the occurrence of a given event (e.g., the release of a new game or game peripheral or accessory, the release of supplemental game content, a holiday sale, a clearance sale, etc.), or other situation, occurrence, event, action, or property occurring external to gameplay.

Triggers may further comprise scheduled triggers based on, for example, attributes of a player profile, or other data. For instance, an administrator or other user may decide to trigger a messaging campaign for gamers that satisfy certain demographic criteria (e.g., based on gender, age, geographic location) or other player profile criteria.

Figure 3:
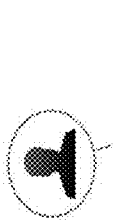
FIG. 3 illustrates an exemplary data structure used to classify actions of video game players according to predefined communication contexts, according to an aspect of the invention.
Figure 4:
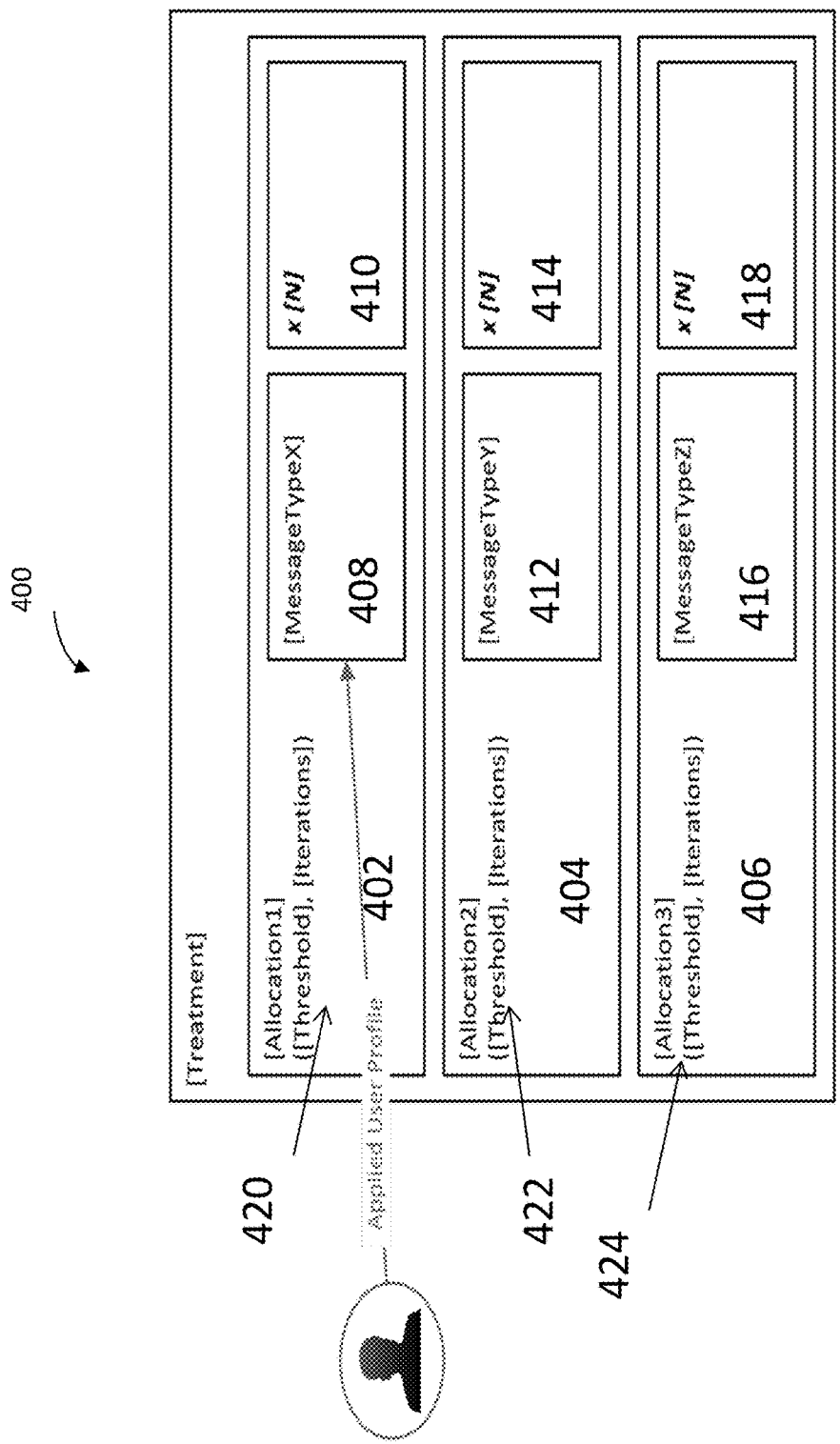
FIG. 4 illustrates an exemplary treatment data structure used to score correlation of user behavior with target variables in a communication context, according to an aspect of the invention.
Figure 5:
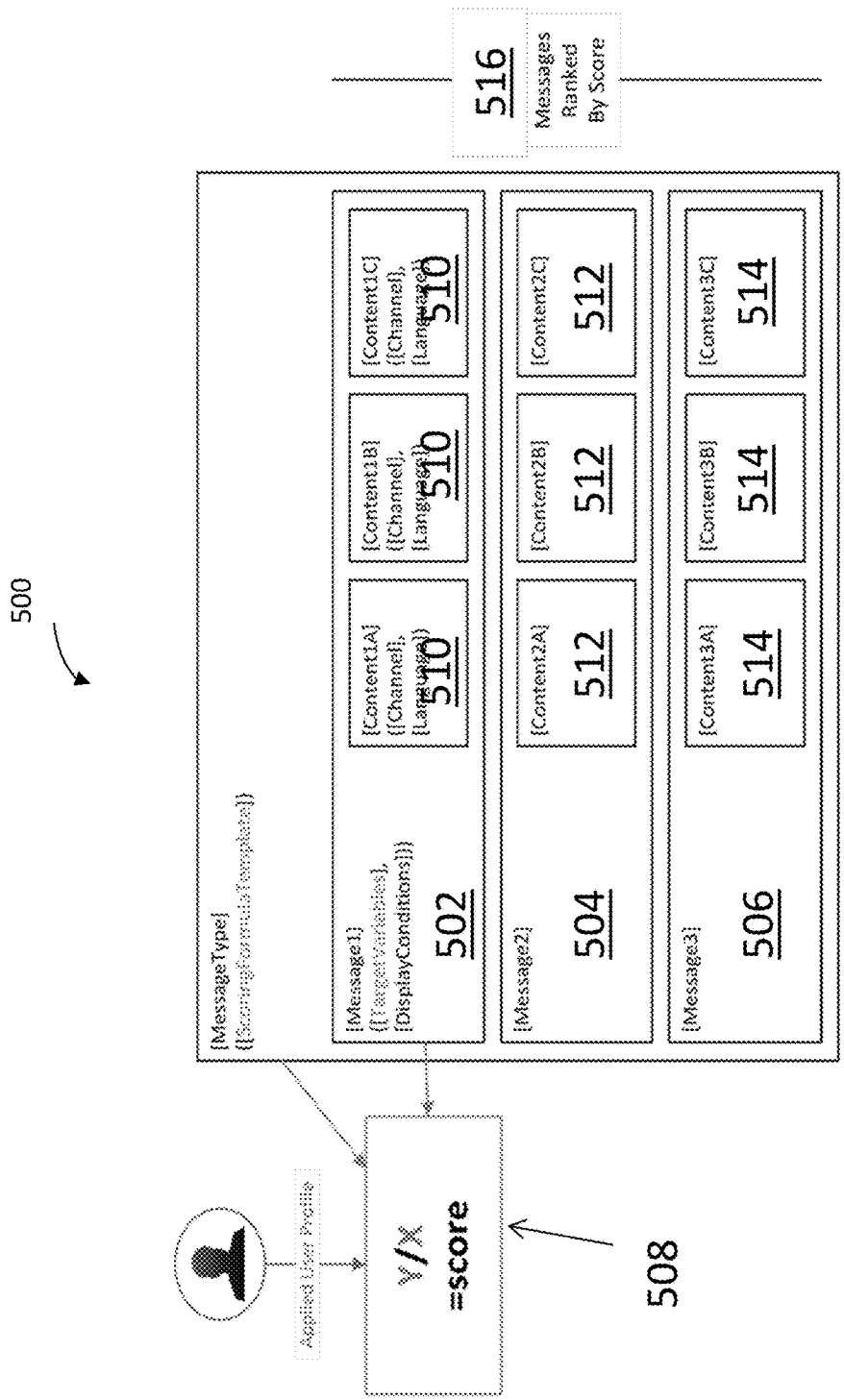
FIG. 5 illustrates an exemplary action allocation data structure used to score correlation of user behavior with target variables in a communication context, according to an aspect of the invention.

Treatment data datastore 136 may be configured to store treatments for various pairings of triggers and user classifications. Examples of user classifications may include, but are not limited to, classifications based on common in-game actions, classifications based on common out-of-game actions, classifications based on common experience levels (e.g., experience levels in a specific video game, experience levels in a given genre of video games, general experience levels regarding video games, etc.), classifications based on common likelihood of purchasing supplemental content (e.g., game-related purchases), etc. As discussed in further detail below and throughout, a given treatment for a trigger/user classification pairing defines one or more allocations. Each allocation in the treatment specifies parameters relating to one or more messages of a particular message type to be sent to game players captured by the user classification. Each message type also has a scoring formula, which is used to determine the relevancy of a particular message of the message type to a particular game player. An allocation may further include thresholds that determine a minimum relevancy score required for a message to be communicated to a game player. FIGS. 3-5, which are addressed in detail below, depict these aspects of the invention in further detail.

Exemplary System Operation

The following description of the operation of the system of the invention is exemplary only, as targeting application 120 may operate in other ways without departing from the scope and substance of the invention described herein. Targeting application 120 may operate to select targeted electronic messages from message datastore 132 for transmission to video game players using treatments stored in treatment data datastore 136. Targeting application 120 may provide the targeted messages to video game players in response to the occurrence (or detection) of a trigger from trigger datastore 134.

Creating Predefined Message Types and Messages

Targeting application 120 may provide administrative users (or other individuals) associated with video game developers, publishers, marketers, or other entities with one or more interfaces to define one or more message types (or message templates). As previously noted, message types may include, for example, gameplay tips, techniques, strategy information, news, awards, milestones, promotions relating to microtransactions or downloadable content (e.g., offers, discounts, etc.), overviews of new products, features, etc., or other message types. A message type serves as a template for all messages of that type, and defines various aspects of such messages, including for example, the format and/or required fields of the message contents, the suitable channels for transmission, and a relevancy scoring formula. Targeting application 120 may operate to store created message types in message datastore 132.

Targeting application 120 may further provide administrative users (or other individuals) associated with video game developers, publishers, marketers, or other entities with one or more interfaces (e.g., including message templates) to create a plurality of predefined electronic messages. In some implementations, each message is a specific instantiation of a particular message type. Creating a predefined message may include creating the content for that particular message. The content may include text for fields commonly found in electronic messages, such as text for a subject of an electronic message, text for a body of an electronic message, etc. The content may further comprise, without limitation, images, audio, video, hyperlinks, attachments, etc. Creating a predefined message may further include selecting particular target values relating to the message's scoring formula. Targeting application 120 may operate to store created electronic messages in message datastore 132. Once entered, the electronic messages may be "predefined" in that they have already been composed (or generated), and need only recipients in order to be transmitted.

Creating and/or Managing Messaging Campaigns and User Treatment Grids

Targeting application 120 may further operate to guide users through the creation of messaging campaigns (or treatments), which may in some implementations be organized as a user treatment grid. For example, targeting application 120 may operate to provide users with one or more interfaces to provide information related to a messaging campaign (e.g., campaign title, description, purpose, number of messages, message types, campaign duration, schedule or frequency of message transmissions, etc.). Targeting application 120 may further enable users to define triggers and/or parameters for the messaging campaign. More particularly, the interface(s) may enable users to specify the trigger and user classification for a particular messaging campaign. Users may further specify threshold numbers that represent a minimum relevance score that a given message must have in order to qualify for treatment for a specific user behavior classification. User treatment grids may further include thresholds that limit the number of messages that may fall within a user behavior classification.

Monitoring for Triggers

Targeting application 120 may monitor operating systems, processes, applications, and/or other resources of computer system(s) 110, server(s) 150, and/or other system components for the occurrence (or detection) of triggers that match triggers in trigger datastore 134.

As a non-limiting example, trigger datastore 134 may maintain a defined trigger corresponding to a date and a time of the beginning of a holiday sale. Trigger management engine 126 may monitor a system clock of computer system(s) 110 and/or server(s) 150 to determine whether the date and/or time of the beginning of the holiday sale has occurred.

As another non-limiting example, trigger datastore 134 may maintain a defined trigger that requires a series of gameplay events to occur (e.g., the act of quitting three games in a row before reaching a specified objective for those games, the act of reaching a milestone in a video game, etc.) before an associated message campaign is to commence. Trigger management engine 126 may monitor user monitoring engine 124 for the occurrence of the series of gameplay events. Trigger management engine 126 may provide a signal to treatment data management engine 128 if a trigger has occurred and/or a trigger condition has been satisfied.

Using Treatments to Identify Targeted Messages

Targeting application 120 may operate to identify treatments for triggers that have occurred (e.g., that been detected by trigger management engine 126). More particularly, in some implementations, treatment data management engine 128 may receive information related to a trigger (from trigger management engine 126) that trigger management engine 126 has detected as occurring. Treatment data management engine 128 may further identify the treatments defined for each user classification associated with the trigger. Treatment data management engine 128 may provide the specific actions to the other engines or components of targeting application 120, such as targeting engine 130.

As an example, treatment data management engine 128 may select actions in response to a trigger corresponding to a date and a time of a holiday sale. In this non-limiting example, the trigger may be associated with two user behavior classifications: (1) a first user classification corresponding to video game players with extensive video game experience, extensive use of digital currencies for in-game purchases, and frequent use of video games; and (2) a second user classification corresponding to video game players with little video game experience, little use of digital currencies for in-game purchases, and infrequent use of video games.

In this example, a user treatment grid in treatment data datastore 136 may specify that video game players falling within the first user classification be provided with a particular treatment comprising five allocations: one gameplay tip and four discounts for in-game items. Moreover, the user treatment grid in treatment data datastore 136 may specify that the video game players falling within the second user classification be provided with a different treatment comprising five allocations, for example, a basic gameplay tip, a news update, a product/new feature overview, and two intermediate gameplay tips.

Treatment data management engine 128 may then identify the appropriate messages for each game player captured by the user classifications. For example, for a given game player, treatment data management engine 128 may calculate the relevancy scores for every predefined message of the message types identified in the treatment. Treatment data management engine 128 may then rank the predefined messages based on relevancy and transmit those most relevant to the game player.

Transmitting Targeted Messages

In some implementations, targeting engine 130 may select one or more channels for distribution of messages to video game players. Targeting engine 130 may, for example, provide messages to players via one or more in-game channels including, without limitation, pop-up windows, chat messages, messages from characters in the video game, messages displayed on objects in the video game, or via other in-game channels. Additionally, messages may be provided to a game player via one or more channels external to (or outside of) a video game including, without limitation, messages in mobile applications external to a video game, Short Messaging Service (SMS) or Multimedia Messaging Service (MMS) messages, emails, messages on a website associated with a video game (e.g., messages to a website that maintains a user forum for users of the video game), traditional mai, or via other external channels. In various implementations, targeting engine 130 bases the selection of distribution channels on information in a user treatment grid associated with an underlying trigger. Targeting engine 130 may configure hardware and/or or software of computer system(s) 110 and/or server(s) 150 to send the targeted messages via the selected channels.

In some implementations, players that are flagged to receive the same treatment may receive messages via the same channel(s). Alternatively, player profiles may be analyzed, prior to transmission of a message, to see if players have specified preferences for delivery for messages via certain channels. In some implementations, specified player preferences may override system default distribution channels. As one example, a given message of a messaging campaign may comprise a gameplay tip to be provided to targeted players via SMS message by default. However, in some implementations, the message may alternatively be transmitted to players via email (or another distribution channel) if the players have opted out of receiving SMS messages.

Exemplary Data Structures

FIG. 3 illustrates an exemplary data structure 300 used to classify actions of video game players according to predefined communication contexts, according to an implementation of the invention. Data structure 300 may include user classification rows 302 and action (or event) columns 304.

Each user classification row 302 may specify a behavior (or other) category for video game players. As an illustrative example, segment 3 may comprise a "High Skill/Churn Risk" behavior category 312 that represents a category of video game players that have extensive experience in the video game, but a high likelihood of quitting the video game altogether (e.g., as predicted by player profile and/or behavioral data).

Each action (or event) column 304 may specify actions (or events) corresponding to the user classification rows 302. For example, action columns 304 may include a "Holiday in-game" action column 306, an "email" column 308, and a web-based communication (e.g., "COD.com") column 310. As shown in FIG. 3, each of the "Holiday in-game" action column 306, "email" column 308, and web-based communication column 310 may specify one or more actions that may be taken for the corresponding "High Skill/Churn Risk"

category 312 (e.g., a first treatment 314, a second treatment 316, and a third treatment 318).

FIG. 4 illustrates an exemplary treatment data structure 400 used to define the allocations for a given treatment, according to an implementation of the invention. Treatment data structure 400 may correspond to one of the actions that may be taken for a user classification. As an example, treatment data structure 400 may correspond to one of the treatment boxes in data structure 300 shown in FIG. 3. Treatment data structure 400 may include one or more allocations. In the example of FIG. 4, treatment data structure 400 includes a first action allocation 402, a second action allocation 404, and a third action allocation 406.

Each of first action allocation 402, second action allocation 404, and third action allocation 406 may include information about specific message types, specific sequences of messages, and/or specific numbers of messages, among other data. For instance, first action allocation 402 may include a first message type listing 408 and a first message number 410. Second action allocation 404 may include a second message type listing 412 and a second message number 414. Third action allocation 406 may include a third message type listing 416 and a third message number 418.

In one implementation, the order of first action allocation 402, second action allocation 404, and third action allocation 406 within treatment data structure 400 may specify the sequence of messages to a video game player.

Moreover, each of first action allocation 402, second action allocation 404, and third action allocation 406 may include information about scoring thresholds. For example, first action allocation 402 may include a first threshold 420, second action allocation 404 may include a second threshold 422, and third action allocation 406 may include a third threshold 424. Each of the first threshold 420, second threshold 422, and third threshold 424 may include (relevancy) scores (e.g., a score resulting from a customized scoring formula) that define the minimum relevance of a message to qualify for inclusion in treatment data structure 400. For example, first threshold 420 may define the minimum relevance of a message to qualify for inclusion in treatment data structure 400. Second threshold 422 may define the minimum relevance of a message to qualify for inclusion in treatment data structure 400. Third threshold 424 may define the minimum relevance of a message to qualify for inclusion in treatment data structure 400.

FIG. 5 depicts an exemplary action allocation data structure 500 used to score correlation of user behavior with target variables in a communication context, according to an implementation of the invention. Action allocation data structure 500 may correspond to one of the action allocations in treatment data structure 400. As an example, action allocation data structure 500 may correspond to one of the first action allocation 402, second action allocation 404, and third action allocation 406 in treatment data structure 400.

Action allocation data structure 500 may include a first message data structure 502, a second message data structure 504, a third message data structure 506, and a scoring template 508. First message data structure 502 may include a first plurality of content items 510. Similarly, second message data structure 504 may include a second plurality of content items 512, and third message data structure 506 may include a third plurality of content items 514. Each of the first plurality of content items 510, second plurality of content items 512, and third plurality of content items 514 may include specific electronic messages for targeting, specific channels, and/or specific languages.

Scoring template 508 may specify the extent messages are correlated with target variables. In the non-limiting example of FIG. 5, scoring template 508 includes the target variables X and Y.

Target variable Y may represent, on a scale of 1 to 10, the amount a video game player plays a specific genre, type, or mode of video games compared to others. Other variables, scales, and/or data may be used.

Target variable X may represent the video game players experience level on a scale of 1 to 10. Other variables, scales, and/or data may be used.

In an example, scoring template 508 may seek players that play a lot of deathmatch games (e.g., have a high Y score) and have a low experience level (e.g., have a low X score). As a result, scoring template 508 may allow messages to be ranked according to the extent Y values are high and X values are low.

In various implementations, action allocation data structure 500 may include a ranking 516 of various messages according to the rules of scoring template 508. A predetermined (e.g., a specified integer) number of messages may be included in the treatment for the video game player, provided they all meet or exceed a threshold score for a particular allocation. In this fashion, the systems and methods described herein may create customized treatments with the most relevant messages based on user profile and behavioral data.

Exemplary Targeting Application Interfaces

According to an aspect of the invention, targeting application 120 may generate various interfaces that enable users to perform various functions. The users may comprise administrative users (or other individuals) associated with video game developers, publishers, marketers, or other entities, without limitation. FIGS. 6-15 depict examples of user interfaces that a user may access in one or more implementations of the invention. The layout of each interface is exemplary in nature, and should not be viewed as limiting. The content of each interface (e.g., available data fields, numerical ranking or grading scales, etc.) may vary in different implementations along with, for instance, the various navigational tools that enable users to select, access, display, or navigate through the features and functionality of the interface, including selection objects (or buttons), drop-down menus, and the like.

Figure 6:
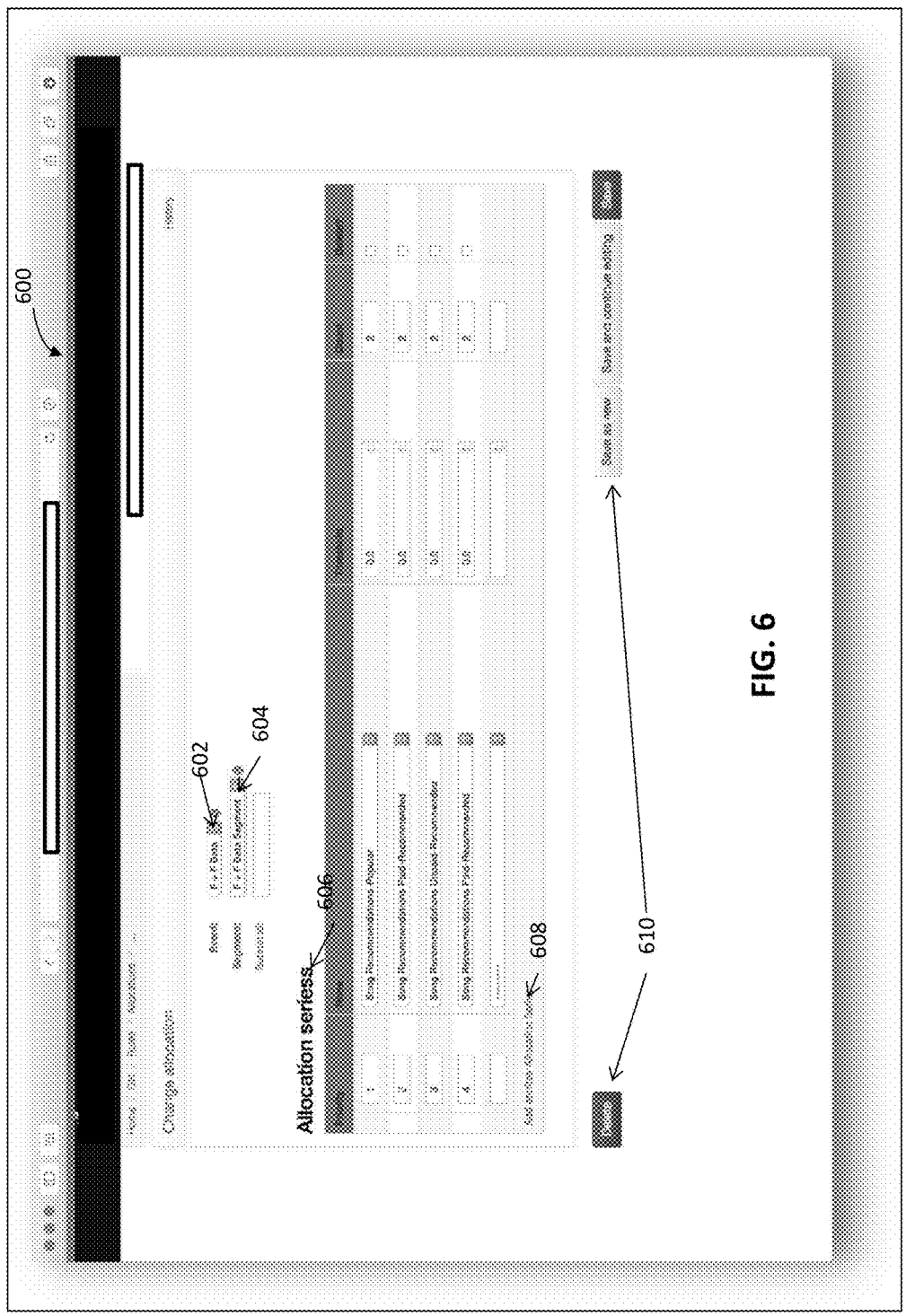
FIG. 6 depicts an exemplary interface of a targeting application, according to an aspect of the invention.

FIG. 6 depicts an exemplary interface 600 of targeting application 120, according to an implementation of the invention. Interface 600 may enable a user to define the number and priority of message types for a given allocation series, the allocation series being defined by an event and segment. Interface 600 may include an event selection UI element 602 that allows a user to specify an event (in the example of FIG. 6, an event relating to a "Friends and Family Beta," or "F+F Beta"), and a segment selection UI element 604 that allows the user to specify a segment of video game players (in the example of FIG. 6, those players participating in the Friends and Family Beta). The specified event and/or the specified segment may form the basis of one or more allocation series.

Interface 600 may further include allocation series UI elements 606 that allow a user to define the allocation series, including the priority information, threshold information, and count information for the allocation series' allocations.

Interface 600 may further include an allocation series addition link 608 that allows the user to add an allocation series.

Interface 600 may further include edit buttons 610 (or other UI elements) that allow a user to delete, save, etc. changes to an allocation series.

Figure 7:
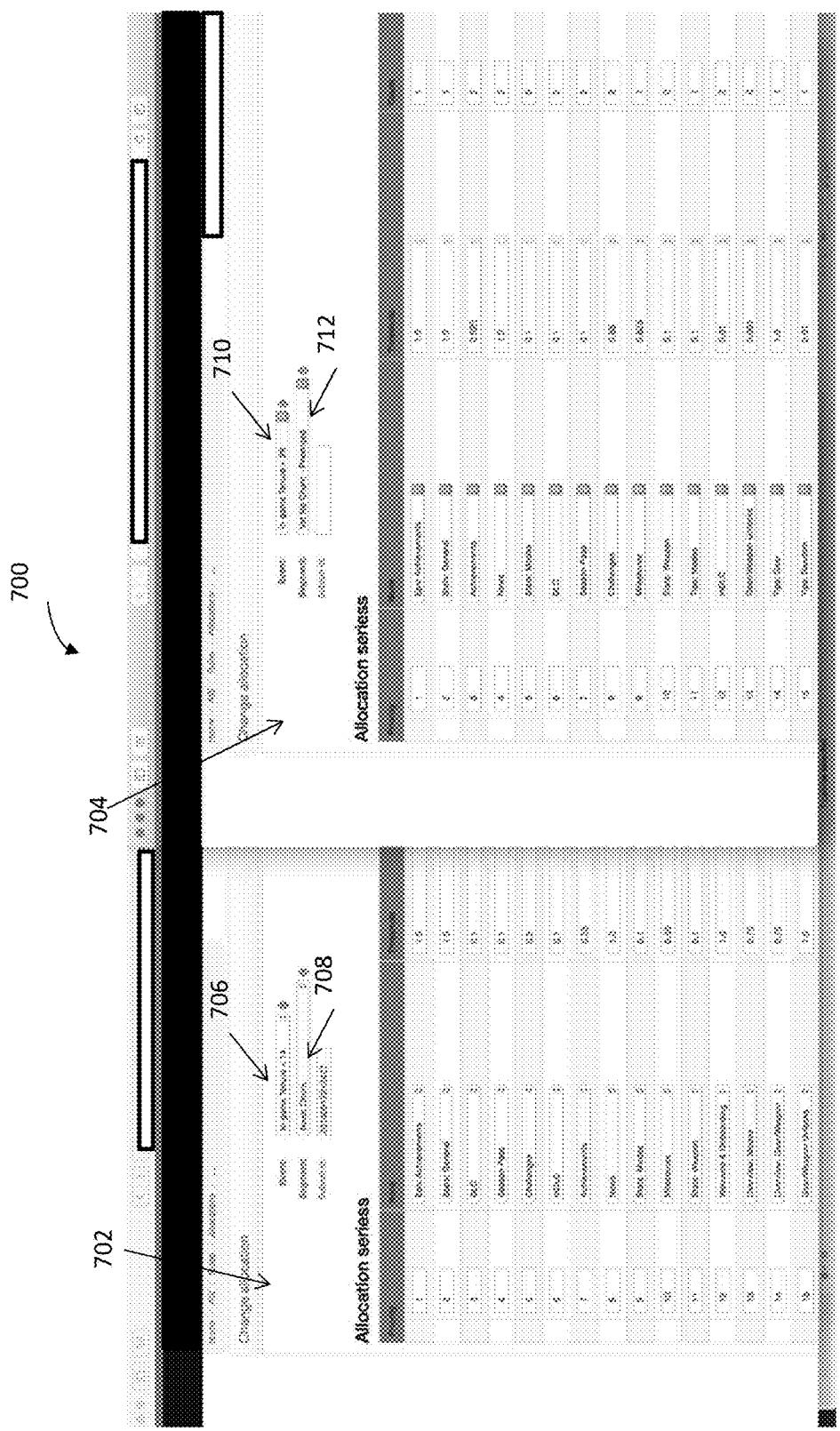
FIG. 7 depicts exemplary interfaces of a targeting application, according to an aspect of the invention.

FIG. 7 depicts exemplary interfaces 700 of targeting application 120, according to an implementation of the invention. Interfaces 700 show a side-by-side comparison of two interfaces (702, 704) that each enable a user to set (or define) an allocation series.

First interface 702 includes a first UI element 706 to specify an event, and a second UI element 708 to specify a segment. In the example shown in interface 702, an allocation series has been set (or defined) for an event relating to video game players with an in-game tenure less than fourteen days, for a segment of video game players comprised of beginners at risk of quitting the game. For example, first UI element 706 specifies an event for video game players with an in-game tenure of less than fourteen days, and second UI element 708 specifies a segment of video game players that is comprised of beginners at risk of quitting the game ("Noob Churn"). First interface 702 may further allow a user to specify the allocation series for the identified event and segment, as described in connection with FIG. 6, for example. Other rating scales and/or naming conventions may be used.

In second interface 704, an allocation series has been set (or defined) for video game players with an in-game tenure greater than twenty-eight days, for a segment of video game players comprised of advanced players who are not at risk of quitting the game. Second interface 704 may include a first UI element 710 to specify an event and a second UI element 712 to specify a segment. First UI element 710 specifies an event for video game players with an in-game tenure of greater than twenty-eight. Second UI element 712 specifies a segment of video game players that is comprised of advanced players who are not at risk of quitting the game ("Vet No Churn—Prestiged"). Second interface 704 may further allow a user to specify the allocation series for the identified event and segment, as described in connection with FIG. 6, for example. Other rating scales and/or naming conventions may be used.

Figure 8:
FIG. 8 depicts an exemplary interface of a targeting application, according to an aspect of the invention.

FIG. 8 depicts an exemplary interface 800 of targeting application 120, according to an implementation of the invention. Interface 800 depicts a set of predefined electronic messages that may be selected for targeted messages to a video game player. More particularly, interface 800 includes a first UI element 802 that allows a user to compose an electronic message. Once composed, an electronic message may be listed in a message list 806, which provides a user with the ability to view predefined messages that have been created. Interface 800 may further include a second UI element 804 that allows users to search predefined electronic messages. Interface 800 may also include a third UI element 808 that users to sort predefined messages.

Figure 9:
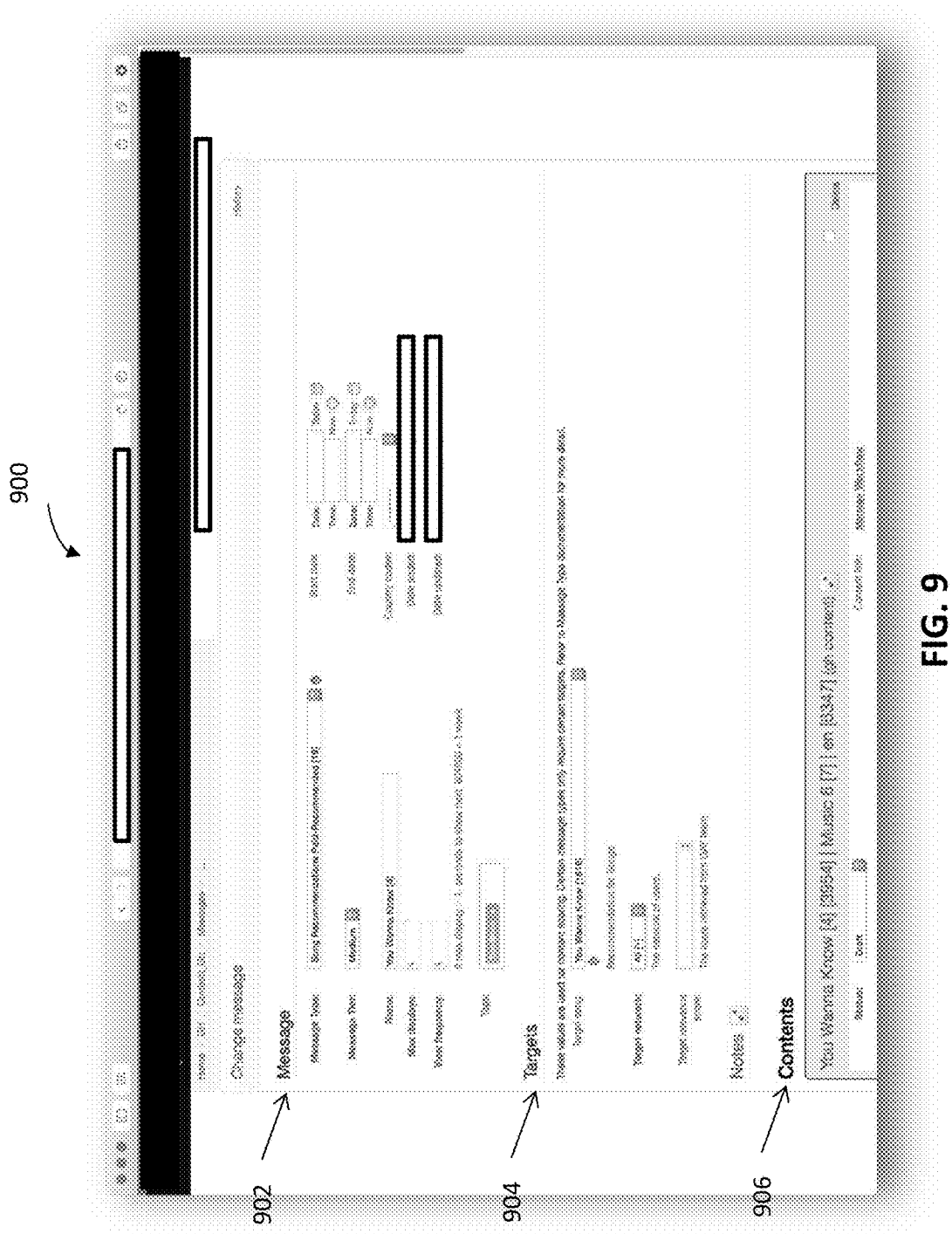
FIG. 9 depicts an exemplary interface of a targeting application, according to an aspect of the invention.

FIG. 9 depicts an exemplary interface 900 of targeting application 120, according to an implementation of the invention. Interface 900 may guide a user through creation of a new predefined message. Interface 900 may include a first UI element 902 that allows a user to specify message parameters (e.g., message type, message tier, message name, maximum displays, view frequencies, tags, start and/or end dates, country codes, dates added and/or uploaded, etc.). Depending on selections made by the user, interface 900 may include further UI elements that allow the user to specify additional values relating to the message. For example, in response to the user's selection of the "Song Recommendation Paid-Recommended" message type, interface 900 may display second UI element 904, which allows the user to specify certain target values relevant to the message type (e.g., target song, target network, target relevance scores, etc.). Likewise, interface 900 may further include a third UI element 906 that allows a user to specify content (e.g., specific songs, video clips, files, etc.) relevant to the selected message type.

Figure 10:
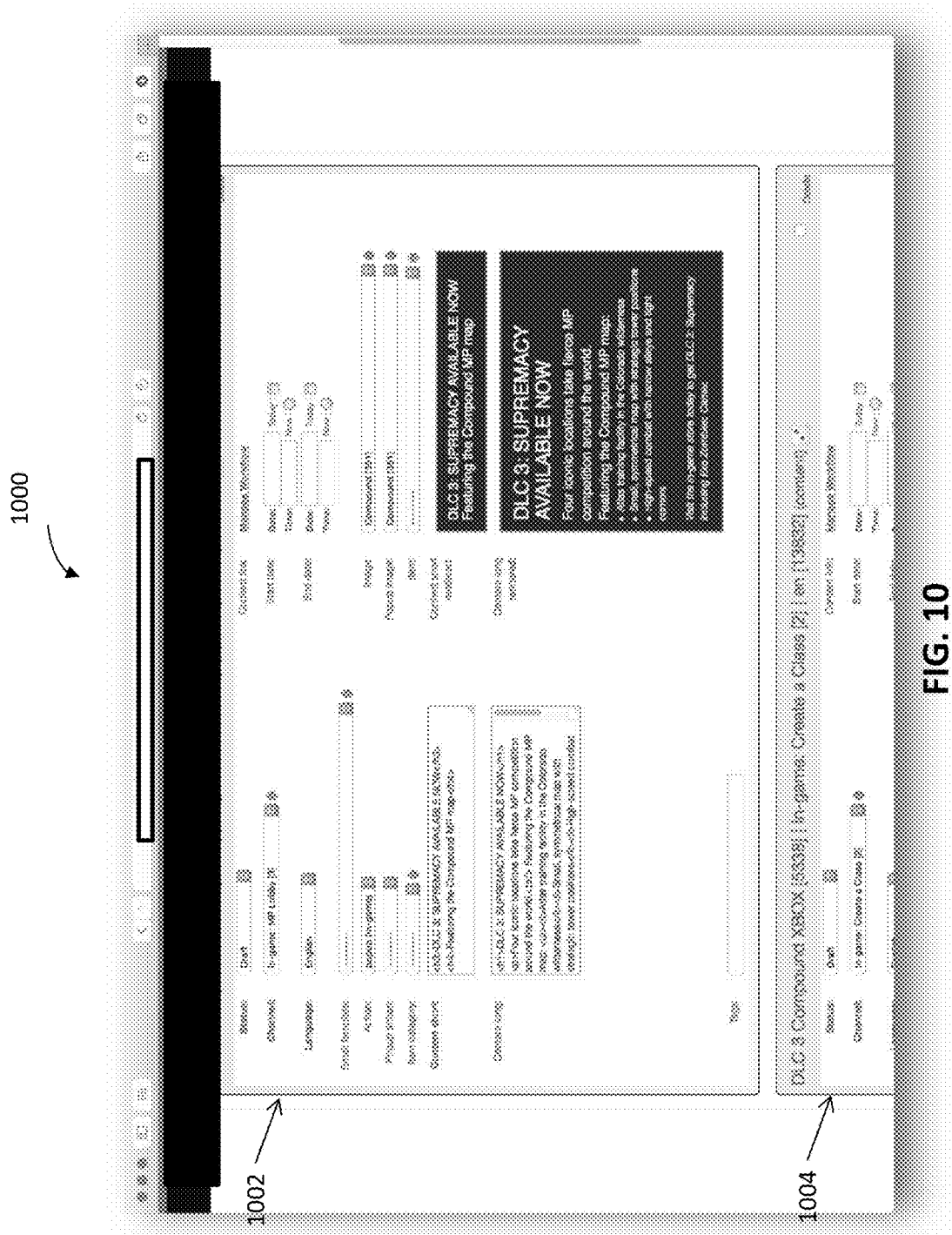
FIG. 10 depicts an exemplary interface of a targeting application, according to an aspect of the invention.

FIG. 10 depicts an exemplary interface 1000 of targeting application 120, according to an implementation of the invention. Interface 1000 may guide a user through creation of a new predefined message. In some implementations, interface 1000 may continue the processes initiated in interface 900 (shown in FIG. 9). Interface 1000 may include a first UI element 1002 that allows the user to specify portions of a predefined message, including the game channel (e.g., in-game lobby, email, gaming lobby, etc.). First UI element 1002 may further allow a user to enter text and other contents related to the predefined message. Interface 1000 may further include a second UI element 1004 that allows a user to enter content related to the predefined message.

Figure 11:
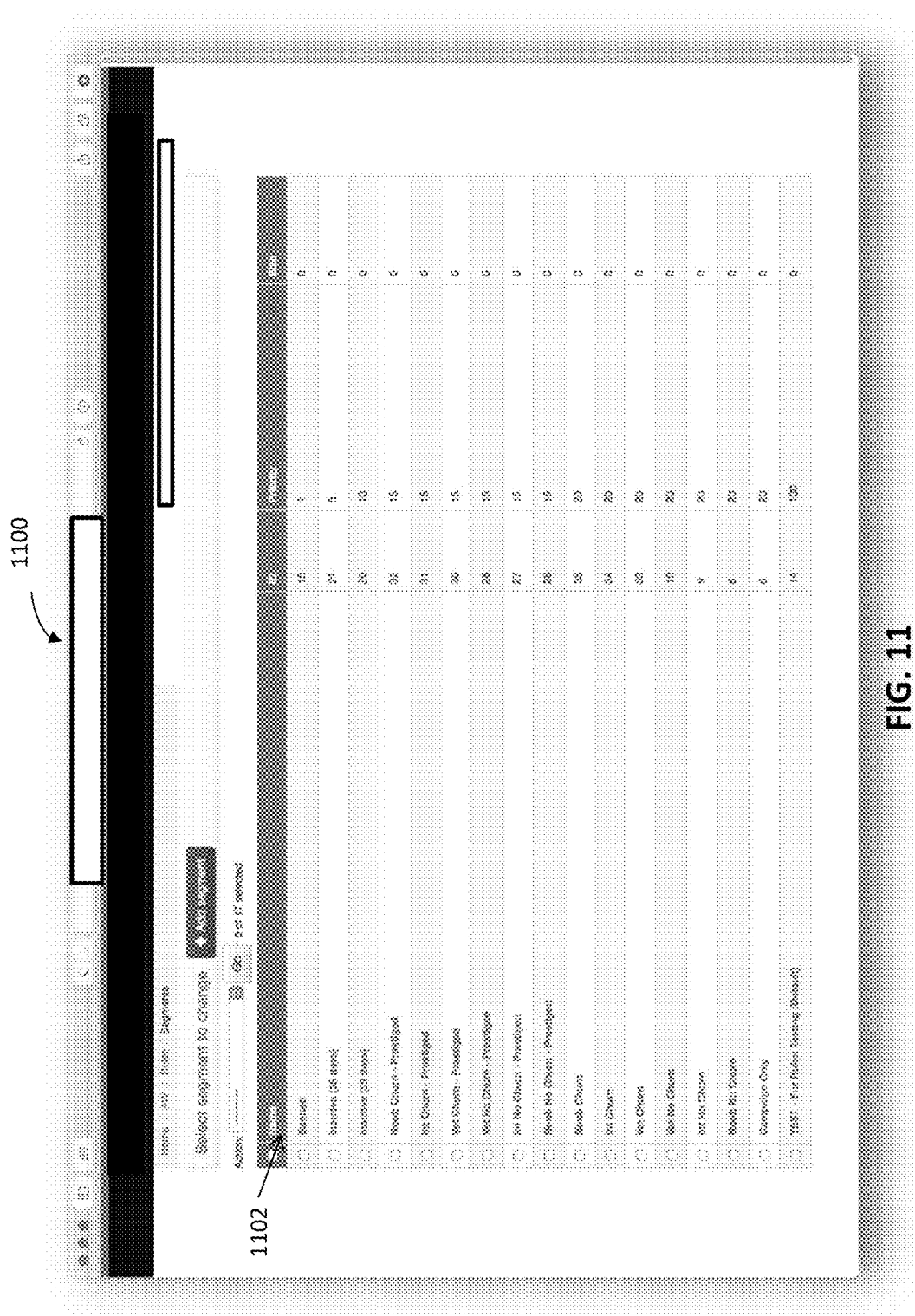
FIG. 11 depicts an exemplary interface of a targeting application, according to an aspect of the invention.

FIG. 11 depicts an exemplary interface 1100 of targeting application 120, according to an implementation of the invention. Interface 1100 may include a UI element 1102 that displays user classifications of video game players. In this example, UI element 1102 allows users to edit one or more of the user classifications.

Figure 12:
FIG. 12 depicts an exemplary interface of a targeting application, according to an aspect of the invention.

FIG. 12 depicts an exemplary interface of targeting application 120, according to an implementation of the invention. Interface 1200 may include a UI element 1202 that displays user classifications of video game players. In this example, UI element 1202 allows users to edit attributes of user classifications.

Figure 13:
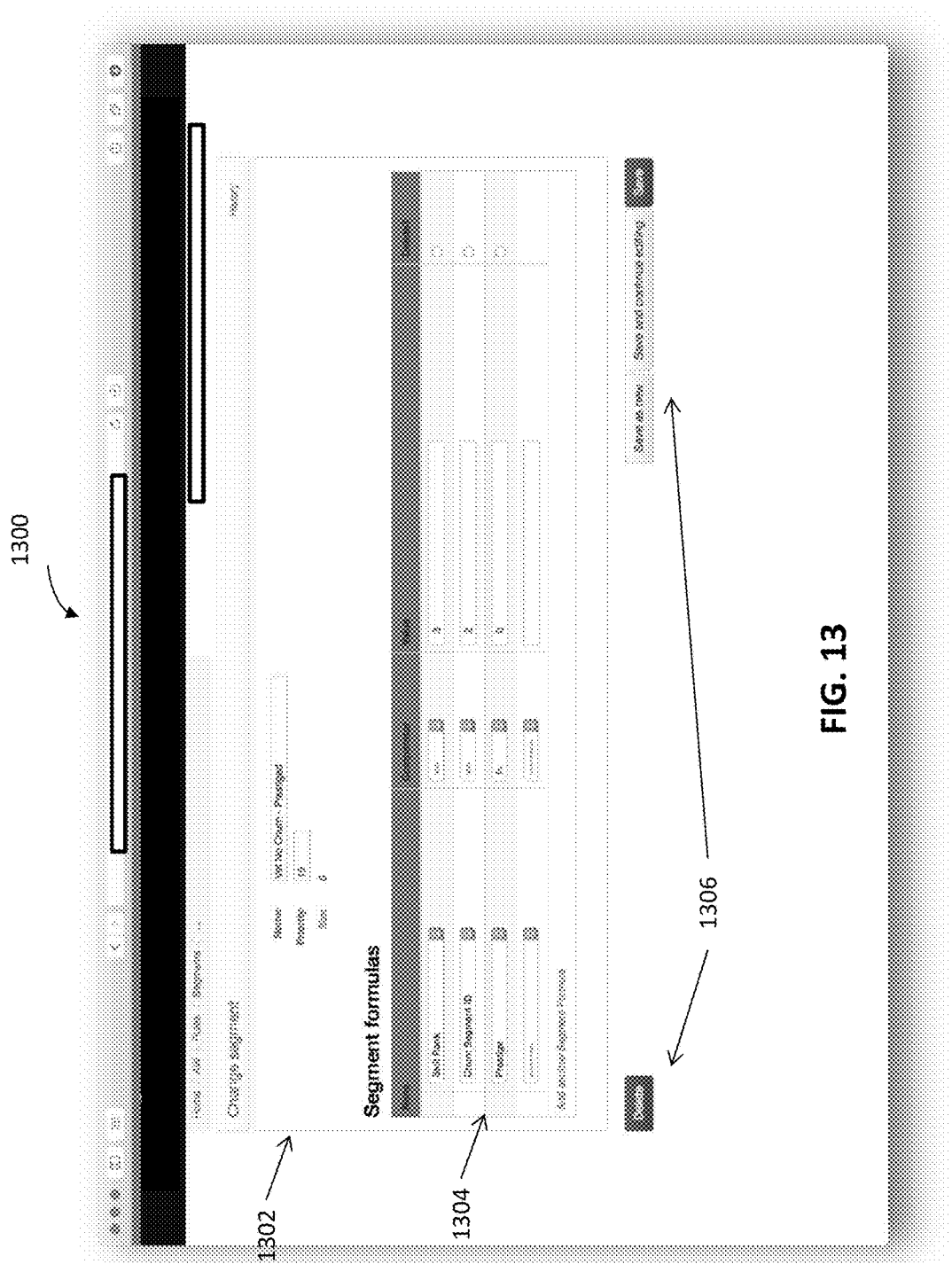
FIG. 13 depicts an exemplary interface of a targeting application, according to an aspect of the invention.

FIG. 13 depicts an exemplary interface 1300 of targeting application 120, according to an implementation of the invention. Interface 1300 may allow a user to specify formulas (or other information) for user classifications. For instance, interface 1300 may include a first UI element 1302 that allows a user to specify formulas for a portion of a behavior category. First UI element 1302 may allow, for instance, specification of formulas for skill ranks and other behavior category identifiers (e.g., churn segment identifiers, prestige identifiers, etc.). Interface 1300 may further include a second UI element 1304 that allows a user to specify a new formula for a behavior category. Interface 1300 may further include edit buttons 1306 that allow users to delete, save, etc. changes to an allocation series.

Figure 14:
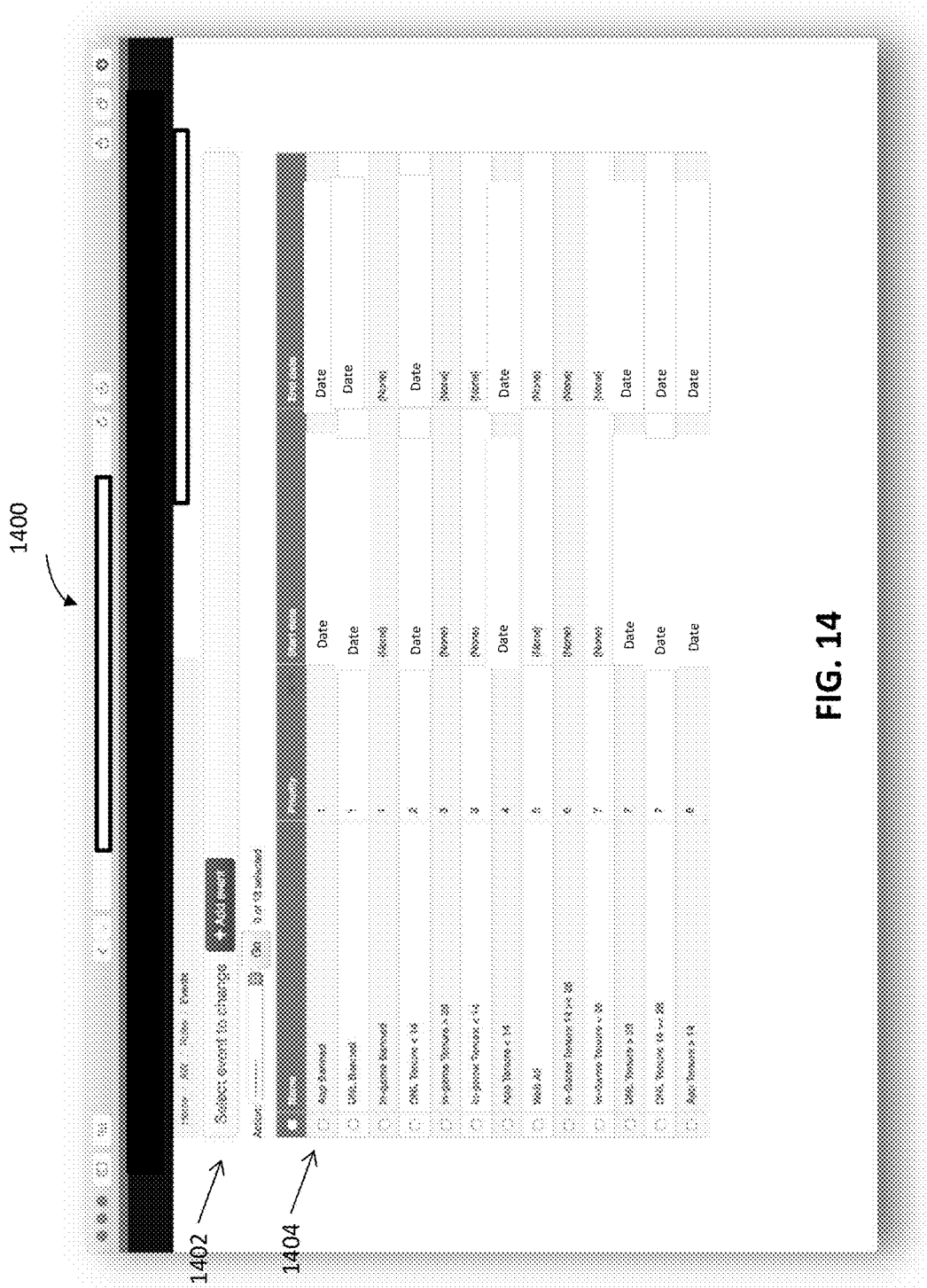
FIG. 14 depicts an exemplary interface of a targeting application, according to an aspect of the invention.

FIG. 14 depicts an exemplary interface 1400 of targeting application 120, according to an implementation of the invention. Interface 1400 may include a first UI element 1402 that allows a user to specify events related to user classifications that can be modified. Interface 1400 may further include a second UI element 1404 that lists events related to user classifications that can be modified.

Figure 15:
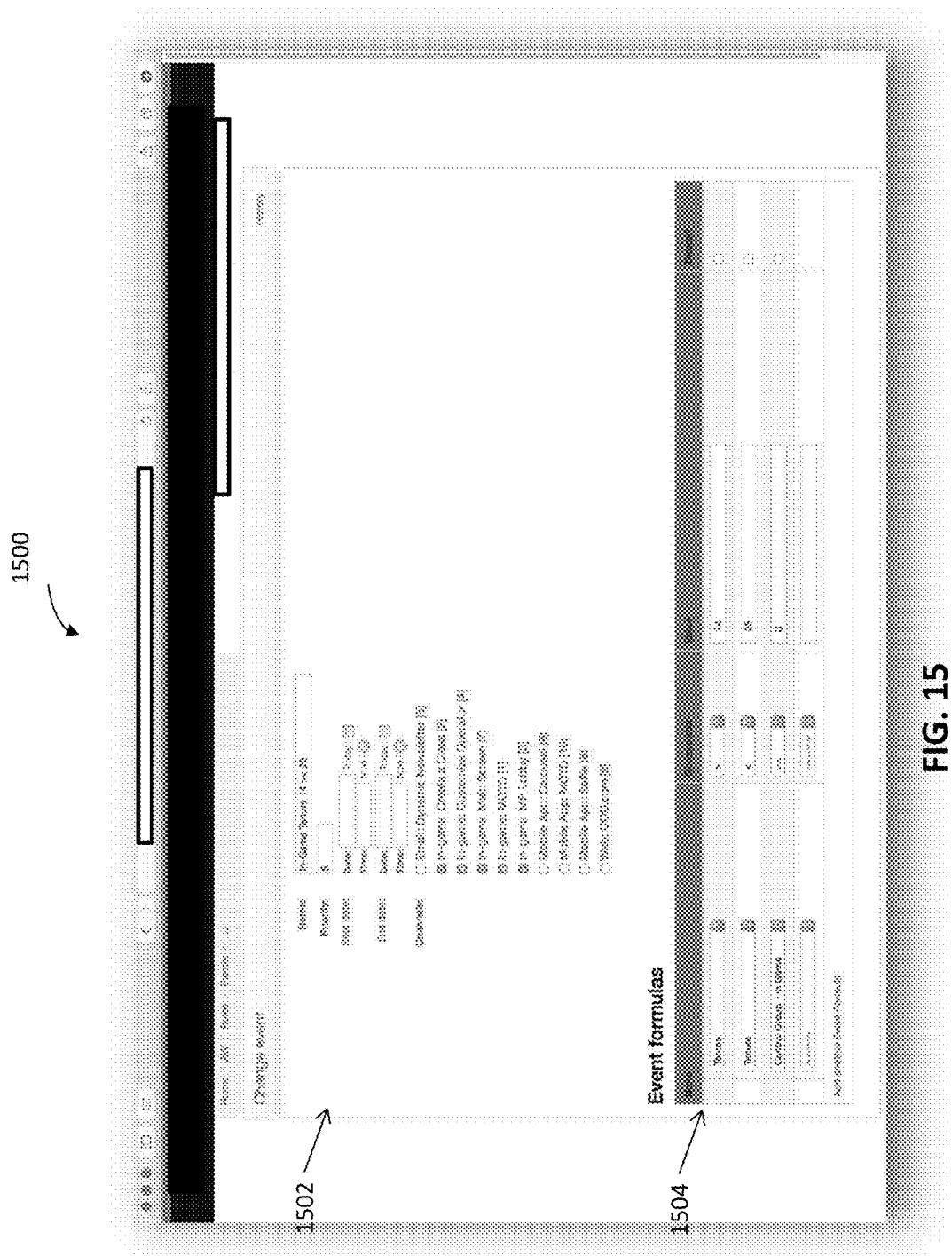
FIG. 15 depicts an exemplary interface of a targeting application, according to an aspect of the invention.

FIG. 15 depicts an exemplary interface 1500 of targeting application 120, according to an implementation of the invention. Interface 1500 may include a first UI element 1502 that lists information associated with an event related to user classifications that can be modified. Interface 1500 may further include a second UI element 1504 that specifies event formulas that may be changed.

Exemplary Flowchart

Figure 16:
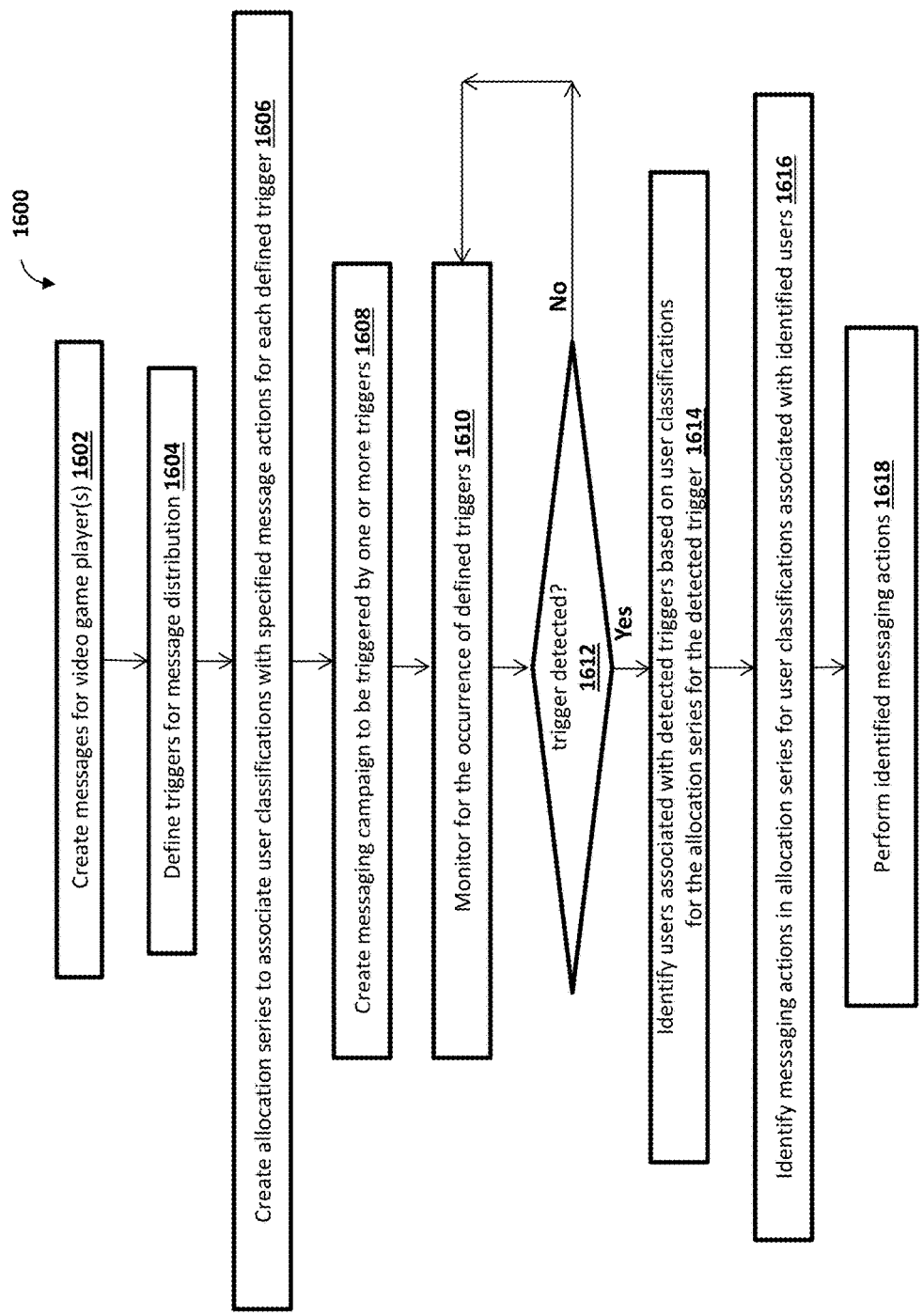
FIG. 16 depicts an exemplary flowchart of processing operations for generating personalized messaging campaigns for video game players, according to an aspect of the invention.

FIG. 16 depicts an exemplary flowchart of processing operations 1600 for generating personalized messaging campaigns for video game players, according to an implementation of the invention. The various processing operations and/or data flows depicted in FIG. 16 are described in greater detail herein. The described operations may be accomplished using some or all of the system components described in detail above and, in some implementations, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

Operation 1602

In an operation 1602, one or more messages may be created. Messages may comprise any communications that can be provided in an electronic format, through one or more channels, including in-game channels and channels external to (or outside of) a video game.

Message types may include, for example, gameplay tips, techniques, strategy information, news, awards, milestones, promotions relating to microtransactions (e.g., offers, discounts, etc.), overviews of new products, features, etc., or other message types.

The messages may be generated by administrative users (or other individuals) associated with video game developers, publishers, marketers, or other entities, without limitation, using one or more system-generated user interfaces.

Message content may include, without limitation, text, images, audio, video, hyperlinks, attachments, etc. The messages generated in operation 1602 may be "predefined" in that they have already been composed (or generated), and need only recipients in order to be transmitted.

Operation 1604

In an operation 1604, one or more triggers used to commence a messaging campaign may be defined. A trigger may comprise any situation, occurrence, event, action, or property related to a video game.

Triggers may comprise in-game triggers including, but not limited to, a player achieving a certain level or objective in a game, a player winning or losing a predetermined number of games in a row, a player performing a certain action in a game (e.g., quitting, shooting one's own teammate, achieving a specific kill/death ("K/D") ratio, etc.), a player making one or more in-game purchases, etc.

Triggers may also comprise triggers external to gameplay such as, for example, a certain date, a time, the occurrence of a given event (e.g., the release of a new game or game peripheral or accessory, the release of supplemental game content, a holiday sale, a clearance sale, etc.), or other situation, occurrence, event, action, or property occurring external to gameplay.

Triggers may further comprise scheduled triggers based on, for example, attributes of a player profile, or other data. For instance, an administrator or other user may decide to trigger a messaging campaign for gamers that satisfy certain demographic criteria (e.g., based on gender, age, geographic location) or other player profile criteria.

Operation 1606

In an operation 1606, game players may be grouped or categorized together with one or more other game players in a user classification based on one or more common player profile attributes, and/or one or more behavioral data characteristics. Examples of user classifications may include, but are not limited to, classifications based on common in-game actions, classifications based on common out-of-game actions, classifications based on common experience levels (e.g., experience levels in a specific video game, experience levels in a given genre of video games, general experience levels regarding video games, etc.), classifications based on common likelihood of purchasing supplemental content (e.g., game-related purchases), etc.

Specific user classifications may be associated with one or more predefined messages in an allocation series. An allocation series may be implemented as a user treatment grid that associates certain messages (to be provided) with certain user classifications. A user treatment grid may include scores that represent the extent to which messages correlate with user classifications. A user treatment grid may further include thresholds that limit the number of messages associated with user classifications.

Operation 1608

In an operation 1608, a customized treatment (or messaging campaign) may be crafted for players based on player profile data, behavioral data, and/or user classification. The customized treatment may comprise some number of predefined messages of varying message types particularly relevant to the players.

Operation 1610

In an operation 1610, operating systems, processes, applications, and/or other system resources of one or more computer systems (e.g., user devices and/or host computers) may be monitored in real-time for the occurrence (or detection) of triggers. As a non-limiting example, in-game actions may be monitored for triggers. User account actions (e.g., logging on, logging out, identifying relationships to other accounts, etc.) related to video game players' accounts may likewise be monitored. Situations, occurrences, actions, etc. of various computer systems or other system components may be compared to situations, occurrences, events, actions, or properties, etc. represented in data structures stored in a datastore to identify matches.

Operation 1612

In an operation 1612, a determination may be made as to whether a trigger has been detected. If a trigger has been detected, processing may continue with an operation 1614. If a trigger has not been detected, processing may resume with operation 1610.

Operation 1614

In an operation 1614, game players associated with detected triggers may be identified based on user classifications for the allocations series for the detected trigger. In some implementations, user treatment grids for any detected triggers are accessed. Players may be identified based on user classifications set forth in the user treatment grids.

Operation 1616

In an operation 1616, messaging actions in an allocation series for the user classifications associated with the identified users may be identified. More particularly, messaging actions may be identified from the user treatment grids for the detected triggers. The messaging actions may include one or more messages to be transmitted via one or more in-game channels and/or one or more channels external to (or outside of) a video game.

In-game channels may include, for example, pop-up windows, chat messages, messages from characters in the video game, messages displayed on objects in the video game, etc. Examples of channels external to (or outside of) a video game may include, without limitation, messages in mobile applications external to a video game, Short Messaging Service (SMS) or Multimedia Messaging Service (MMS) messages, emails, messages on a website associated with a video game (e.g., messages to a website that maintains a user forum for users of the video game), etc.

Operation 1618

In an operation 1618, the messaging campaign is commenced and identified messages may be transmitted to the appropriate players through the designated channels.

For purposes of explanation, numerous specific details are set forth in order to provide a thorough understanding of the description. It will be apparent, however, to one skilled in the art that implementations of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one implementation", "an implementation", "some implementations", "various implementations", "certain implementations", "other implementations", "one series of implementations", or the like means that a particular feature, design, structure, or characteristic described in connection with the implementation is included in at least one implementation of the disclosure. The appearances of, for example, the phrase "in one implementation" or "in an implementation" in various places in the specification are not necessarily all referring to the same implementation, nor are separate or alternative implementations mutually exclusive of other implementations. Moreover, whether or not there is express reference to an "implementation" or the like, various features are described, which may be variously combined and included in some implementations, but also variously omitted in other implementations. Similarly, various features are described that may be preferences or requirements for some implementations, but not other implementations.

Other implementations, uses and advantages of the invention will be apparent to those skilled in the art from consideration of the specification and practice of the invention disclosed herein. The specification should be considered exemplary only, and the scope of the invention is accordingly intended to be limited only by the following claims. For example, though portions of the foregoing discussion related to the use of the invention to deliver personalize messages to video game players, one of skill in the art will recognize that the system and methods disclosed herein can be used to deliver personalized messages to users of a variety of applications and systems.

What is claimed is:

1. A computer-implemented method of generating personalized messaging campaigns for video game players, the method being implemented in a host computer system having one or more physical processors programmed with computer program instructions that, when executed by the one or more physical processors, cause the host computer system to perform the method and wherein the host computer system is remote from, and in data communication with, a plurality of computer devices to facilitate a multiplayer game between the video game players, the method comprising:

detecting, by the host computer system, an occurrence of a trigger, wherein the trigger is at least one of an event, action or property related to a video game and wherein the trigger is detected using a trigger management engine integrated within the computer program instructions;

accessing, by the host computer system, a data structure stored in one or more datastores remote from the plurality of computer devices, wherein the data structure relates the trigger, at least one user classification, and one or more treatments in a predefined format;

identifying, by the host computer system and the data structure, the at least one user classification associated with the detected trigger, the at least one user classification grouping one or more video game players based on player profile data and/or player behavioral data;

identifying, by the host computer system and the data structure, the one or more treatments associated with the at least one user classification, each of the one or more treatments comprising one or more allocations, each of the one or more allocations comprising a predetermined number of messages of varying message type eligible to be transmitted to the one or more video game players in the at least one user classification; and for each of the one or more video game players grouped in the at least one user classification:
   (i) determining, by the host computer system, a relevancy score for each of the predetermined number of messages;
   (ii) ranking, by the host computer system, the predetermined number of messages according to the determined relevancy scores; and
   (iii) selecting for transmission, by the host computer system, one or more messages having a relevancy score that meets or exceeds a predetermined threshold.

2. The computer-implemented method of claim 1, wherein said trigger comprises an event related to gameplay, wherein the event related to gameplay is at least one of a player achieving a certain level in a game, a player achieving a certain objective in a game, a player losing a predetermined number of games in a row, a player winning a predetermined number of games in a row, a player performing a certain action in a game or a player making one or more in-game purchases.

3. The computer-implemented method of claim 2, wherein said trigger comprises a series of the events related to gameplay.

4. The computer-implemented method of claim 1, wherein said trigger comprises an event external to gameplay, wherein the event external to gameplay is at least one of a date or a time.

5. The computer-implemented method of claim 1, wherein said trigger comprises a scheduled trigger based on attributes of a player profile.

6. The computer-implemented method of claim 1, wherein said trigger comprises a scheduled trigger based on demographic data of players.

7. A system for generating personalized messaging campaigns for video game players, wherein the system comprises a host computer that is remote from, and in data communication with, a plurality of computer devices to facilitate a multiplayer game between the video game players the system comprising:

one or more physical processors in the host computer programmed with one or more computer program instructions which, when executed, cause the one or more physical processors to:

detect an occurrence of a trigger, wherein the trigger is at least one of an event, action or property related to a video game and wherein the trigger is detected using a trigger management engine that is part of the one or more computer program instructions;

access a data structure stored in one or more datastores remote from the plurality of computer devices, wherein the data structure relates the trigger, at least one user classification, and one or more treatments in a predefined format;

identify the at least one user classification associated with the detected trigger from the data structure, the at least one user classification grouping one or more video game players based on player profile data and/or player behavioral data;

identify the one or more treatments associated with the at least one user classification from the data structure, each of the one or more treatments comprising one or more allocations, each of the one or more allocations comprising a predetermined number of messages of varying message type eligible to be transmitted to the one or more video game players in the at least one user classification; and for each of the one or more video game players grouped in the at least one user classification:
  (i) determine a relevancy score for each of the predetermined number of messages;
  (ii) rank the predetermined number of messages according to the determined relevancy scores; and
  (iii) select for transmission one or more messages having a relevancy score that meets or exceeds a predetermined threshold.

8. The system of claim 7, wherein said trigger comprises an event related to gameplay, wherein the event related to gameplay is at least one of a player achieving a certain level in a game, a player achieving a certain objective in a game, a player losing a predetermined number of games in a row, a player winning a predetermined number of games in a row, a player performing a certain action in a game or a player making one or more in-game purchases.

9. The system of claim 8, wherein said trigger comprises a series of the events related to gameplay.

10. The system of claim 7, wherein said trigger comprises an event external to gameplay, wherein the event external to gameplay is at least one of a date or a time.

11. The system of claim 7, wherein said trigger comprises a scheduled trigger based on attributes of a player profile.

12. The system of claim 7, wherein said trigger comprises a scheduled trigger based on demographic data of players.

13. A computer program product located in a host computer system that is remote from, and in data communication with, a plurality of computer devices to facilitate a multi-player game between video game players, wherein the computer program product generates personalized messaging campaigns for video game players and comprises:

one or more tangible, non-transitory computer-readable storage devices;

program instructions, stored on at least one of the one or more tangible, non-transitory computer-readable storage devices that, when executed, cause the host computer to:

detect an occurrence of a trigger, wherein the trigger is at least one of an event, action or property related to a video game and wherein the trigger is detected using a trigger management engine integrated within the computer program product;

access a data structure stored in one or more datastores remote from the plurality of computer devices, wherein the data structure relates the trigger, at least one user classification, and one or more treatments in a predefined format;

identify the at least one user classification associated with the detected trigger using the data structure, the at least one user classification grouping one or more video game players based on player profile data and/or player behavioral data;

identify the one or more treatments associated with the at least one user classification using the data structure, each of the one or more treatments comprising one or more allocations, each of the one or more allocations comprising a predetermined number of messages of varying message type eligible to be transmitted to the one or more video game players in the at least one user classification; and for each of the one or more video game players grouped in the at least one user classification:
  (i) determine a relevancy score for each of the predetermined number of messages;
  (ii) rank the predetermined number of messages according to the determined relevancy scores; and
  (iii) select for transmission one or more messages having a relevancy score that meets or exceeds a predetermined threshold.

14. The computer program product of claim 13 wherein said trigger comprises an event related to gameplay, wherein the event related to gameplay is at least one of a player achieving a certain level in a game, a player achieving a certain objective in a game, a player losing a predetermined number of games in a row, a player winning a predetermined number of games in a row, a player performing a certain action in a game or a player making one or more in-game purchases.

15. The computer program product of claim 14, wherein said trigger comprises a series of the events related to gameplay.

16. The computer program product of claim 13, wherein said trigger comprises an event external to gameplay, wherein the event external to gameplay is at least one of a date or a time.

17. The computer program product of claim 13, wherein said trigger comprises a scheduled trigger based on attributes of a player profile.

18. The computer program product of claim 13, wherein said trigger comprises a scheduled trigger based on demographic data of players.

* * * * *